(12) United States Patent
Nuessen et al.

(10) Patent No.: US 11,807,392 B2
(45) Date of Patent: Nov. 7, 2023

(54) BASEPLATES FOR KEYED INSTALLATION OF COMPONENTS IN A CARGO HOLD AND LOADING AND STORAGE SYSTEM AND ASSOCIATED METHODS

(71) Applicant: Airbus Operations GmbH, Hamburg (DE)

(72) Inventors: Oliver Nuessen, Bremen (DE); Martin Guse, Hamburg (DE); Dirk Meiranke, Hamburg (DE); Sascha Nowarre, Riede (DE); Dennis Fischer, Hamburg (DE); Uwe Panzram, Ganderkesee (DE); Matthias Horst, Ganderkesee (DE)

(73) Assignee: Airbus Operations GmbH, Hamburg (DE)

( * ) Notice: Subject to any disclaimer, the term of this patent is extended or adjusted under 35 U.S.C. 154(b) by 343 days.

(21) Appl. No.: 17/361,999

(22) Filed: Jun. 29, 2021

(65) Prior Publication Data

US 2021/0394905 A1 Dec. 23, 2021

Related U.S. Application Data

(63) Continuation of application No. PCT/IB2019/061236, filed on Dec. 20, 2019.
(Continued)

(51) Int. Cl.
*B64D 9/00* (2006.01)
*B64C 1/20* (2006.01)

(52) U.S. Cl.
CPC ............... *B64D 9/003* (2013.01); *B64C 1/20* (2013.01); *B64D 2009/006* (2013.01)

(58) Field of Classification Search
CPC ...... B64D 9/003; B64D 2009/006; B64C 1/20
See application file for complete search history.

(56) References Cited

U.S. PATENT DOCUMENTS 5,302,065 A * 4/1994 Vogg ................... B64D 11/0696
411/85
5,871,318 A * 2/1999 Dixon ................ B60N 2/01558
410/104
(Continued)

FOREIGN PATENT DOCUMENTS

| EP | 1593548 A2 * | 11/2005 | ............. B64D 9/003 |
| EP | 1 527 993 B1 | 2/2009 | |
| EP | 2647569 A2 | 10/2013 | |

OTHER PUBLICATIONS

International Search Report and Written Opinion for Application No. PCT/IB2019/061236 dated Apr. 2, 2020.

*Primary Examiner* — Richard G Davis
(74) *Attorney, Agent, or Firm* — KDW FIRM PLLC

(57) ABSTRACT

A system for ensuring proper installation of components of a cargo management system within a cargo hold has cleats rigidly attached to a floor of the cargo hold, a first subset of the cleats having insets of a first shape, a second subset of cleats having insets of a second shape, keys and rotatable fasteners attached to the components of the cargo management system, a first subset of the keys having the first shape and a second subset of the keys having the second shape. The first subset of keys can only engage with the first subset of cleats and the second subset of keys can only engage with the second subset of cleats and the rotatable fasteners utilize a rotary movement to secure the components of the cargo management system to a respective cleat, against which the rotary fastener is engaged.

20 Claims, 30 Drawing Sheets

Related U.S. Application Data

(60) Provisional application No. 62/786,718, filed on Dec. 31, 2018, provisional application No. 62/786,747, filed on Dec. 31, 2018, provisional application No. 62/786,736, filed on Dec. 31, 2018.

(56) References Cited

U.S. PATENT DOCUMENTS

| | | |
|---|---|---|
| 6,557,800 B2 | 5/2003 | Medina et al. |
| 8,387,919 B2 | 3/2013 | Huber et al. |
| 9,340,276 B2 * | 5/2016 | Schneider |
| 2009/0230241 A1 * | 9/2009 | Heller ............... B60P 7/0815 244/118.1 |
| 2013/0259593 A1 * | 10/2013 | Moradians ............ B64D 9/003 410/77 |
| 2018/0111689 A1 | 4/2018 | Huber et al. |

* cited by examiner

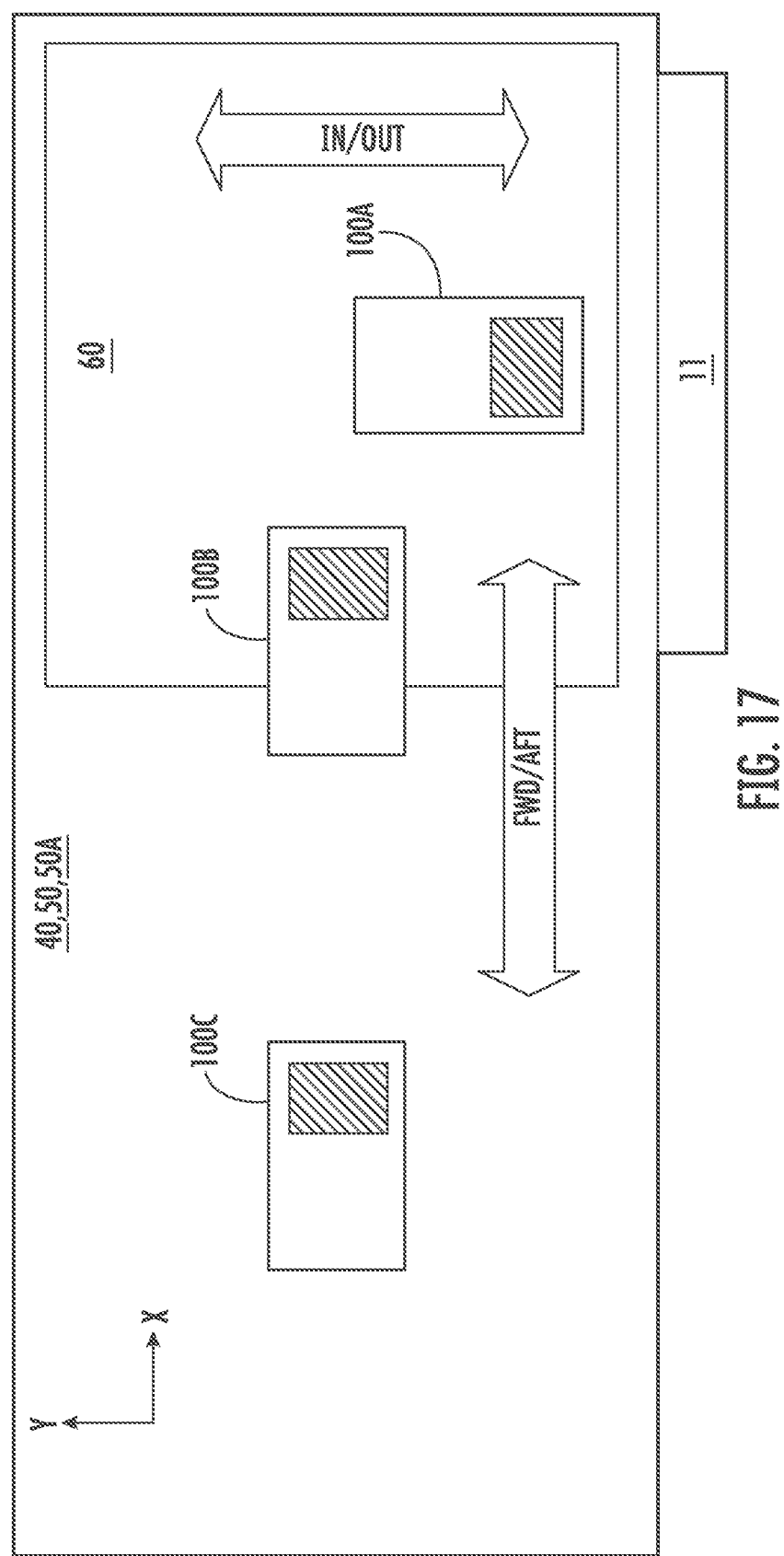

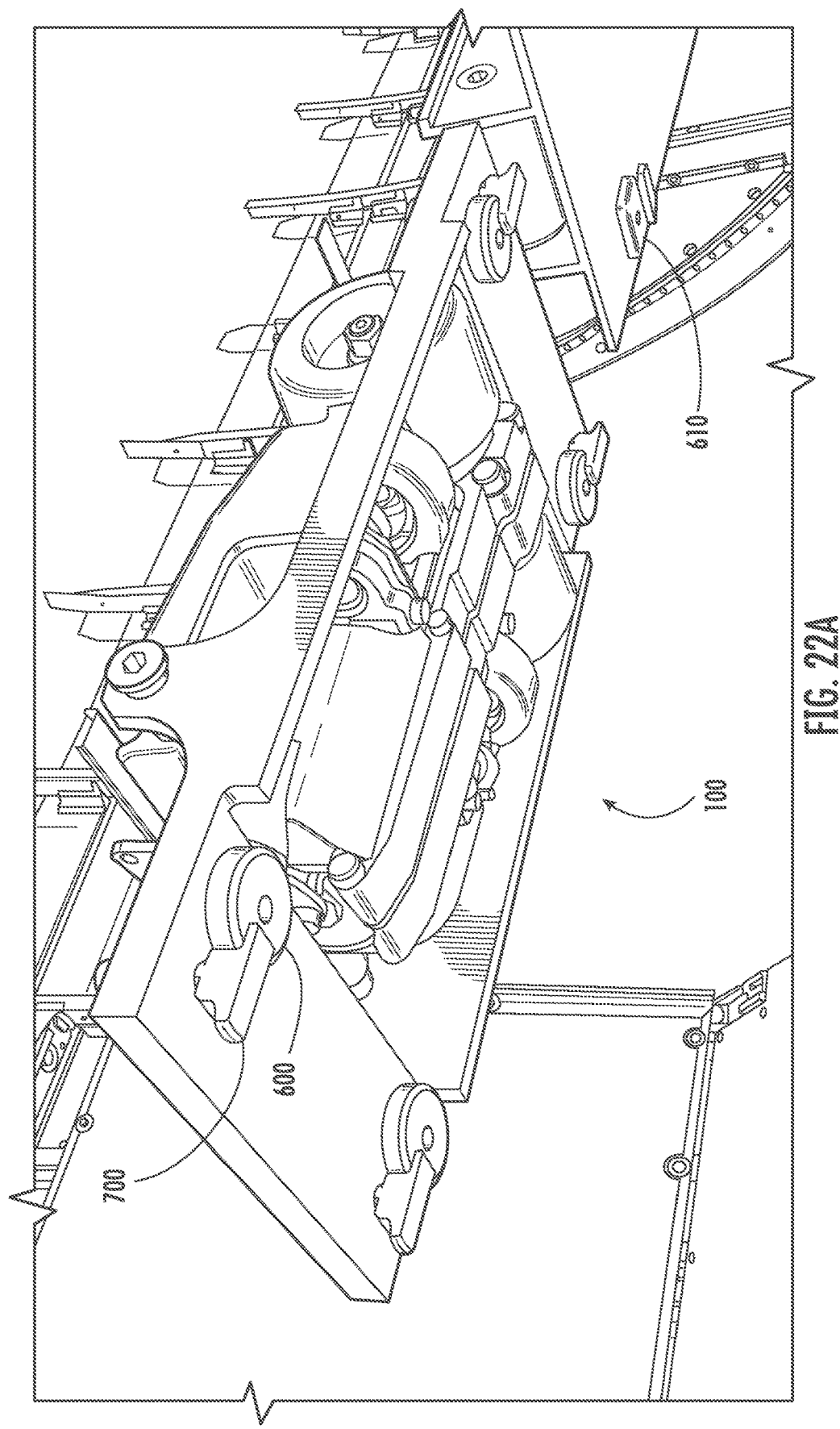

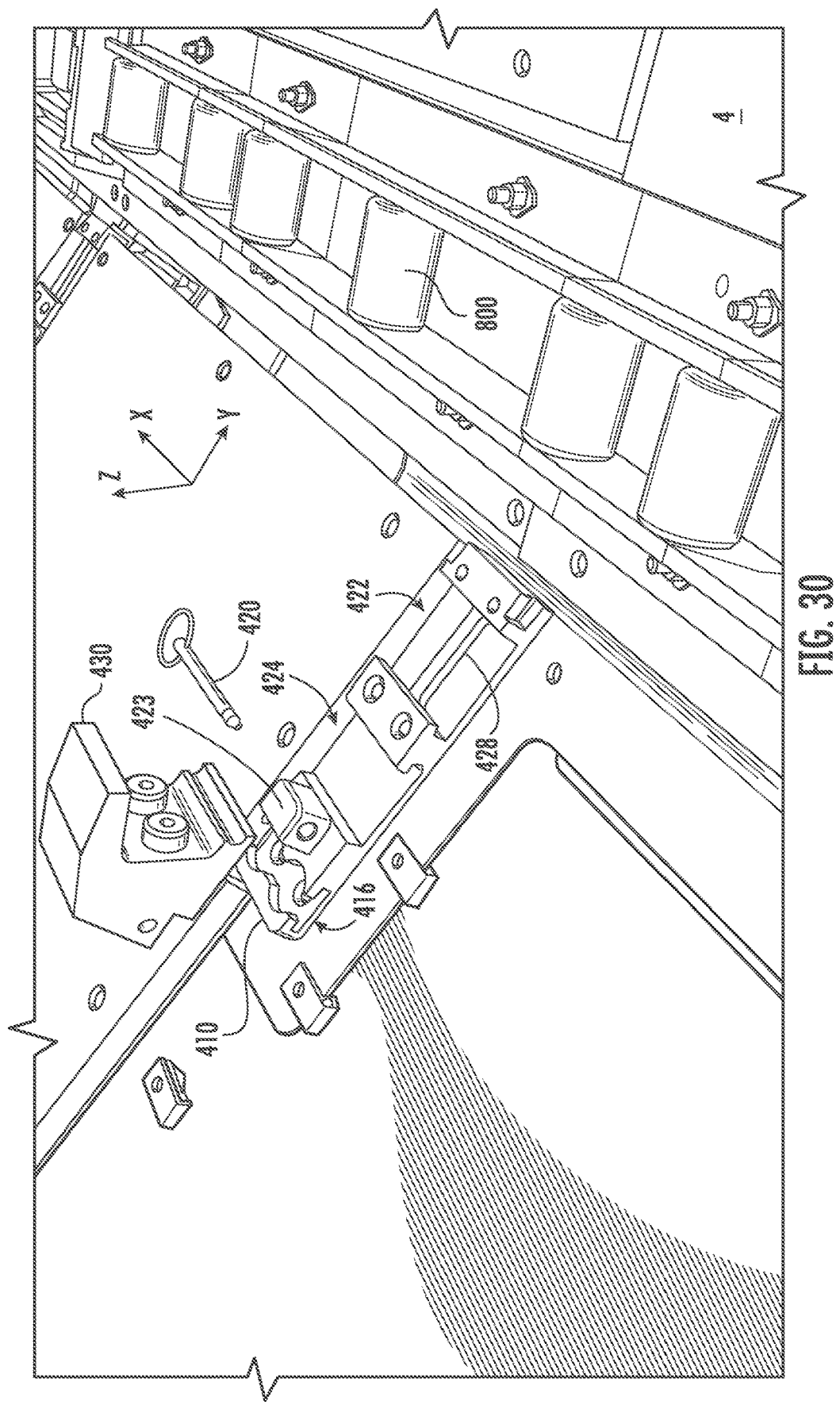

BASEPLATES FOR KEYED INSTALLATION OF COMPONENTS IN A CARGO HOLD AND LOADING AND STORAGE SYSTEM AND ASSOCIATED METHODS

CROSS-REFERENCE TO RELATED APPLICATIONS

This application is a continuation of and claims priority to PCT Application No. PCT/IB2019/061236, which was filed Dec. 20, 2019, which claims the benefit of and priority to U.S. Provisional Patent Application Ser. No. 62/786,718, which was filed Dec. 31, 2018, U.S. Provisional Patent Application Ser. No. 62/786,736, which was filed Dec. 31, 2018, and U.S. Provisional Patent Application Ser. No. 62/786,747, which was filed Dec. 31, 2018, each of which are incorporated herein by reference in their entirety.

TECHNICAL FIELD

The disclosure herein relates to a system for moving loads, in particular within a cargo hold area of an aircraft, as well as a locking arrangement and transport vehicle for being used in the system. Moreover, the disclosure herein relates to a method of operating a respective system for moving loads (e.g., cargo containers) within a cargo hold area (e.g., of an aircraft).

BACKGROUND

Cargo holds for cargo or passenger aircraft are normally used either for loading with cargo containers or for so-called bulk loading. Such cargo containers can be standardized containers or standardized pallets, sometimes referred to as Unit Load Devices (ULDs). For moving the ULDs within the cargo hold, rows of rollers are typically integrated into a cargo hold floor of the cargo hold which, depending on their specific design, may allow for a direction-dependent or direction-independent movement of the ULDs. A cargo hold comprising a respective row of rollers is shown, for example, in EP 1 527 993 B1.

The ULDs can be manually pushed and moved on the row of rollers. Alternatively, an electric drive system comprising Power Drive Units (PDUs) within or next to the row of rollers can be used for automatically moving the ULDs within the cargo hold.

It is further known to, in addition or as an alternative to possible PDUs, use transport vehicles for moving the ULDs along the row of rollers and in parallel to the cargo hold floor. Such transport vehicles are typically only exerted to reaction and/or inertial forces from moving the ULDs, whereas the often significantly higher weight forces are carried by the row of rollers.

When arranging loads, in particular in the form of ULDs, within the cargo hold, it has to be ensured that these are reliably held in place during transport. This specifically relates to the cargo hold of an aircraft which experiences large forces and shocks during takeoff and landing. It is known to use locking arrangements for this purpose, which may be floor-mounted or even integrated into the row of rollers. Yet, for activating these locking arrangements, these have to be either manually operated or each equipped with individual motors and actuation systems. The latter alternative further requires cabling to connect the motors to some form of remote control unit. This way, the system's overall weight and complexity are significantly increased.

For loading with cargo containers, loading with often very bulky and heavy cargo containers is supported by specific components (e.g., rollers and various latches) that are installed in the hold. Amongst other tasks, these components here support the loading of cargo containers into the hold and the transport of the cargo containers inside the hold. Such cargo containers may be filled with several baggage items or freight of other types. For bulk loading, the hold is loaded in a loose arrangement with the individual baggage items or freight items of other types to be transported.

Currently known designs for cargo management systems in a cargo hold of an aircraft are installed as a unitary system that is installed and is not easily modified without requiring a large investment in terms of reconfiguring the components of the cargo management system within the cargo hold. As such, a need exists for a cargo management system that is flexible and easily reconfigurable to accommodate a plurality of differently dimensioned cargo containers in a significantly reduced time, ideally requiring less than four hours of downtime to reduce labor costs associated with such reconfigurations efforts.

SUMMARY

Although some of the aspects and details described above have been described in relation to the cargo hold component system, these aspects may also be implemented accordingly in the hold. Furthermore, the features of the cargo hold component system described should not be regarded as stand-alone features. Rather, all features of the cargo hold component system may be combined with an arbitrary number of other described features.

According to an example embodiment, a latch for a cargo management system of a cargo hold is provided, the latch comprising: a base plate configured for rigid attachment to a surface of the cargo hold; a latch head attached to the base plate and configured to prevent a movement of at least one cargo unit in a Y-direction and a Z-direction and to allow a movement of the at least one cargo unit in an X-direction; and a roller assembly attached to the base plate, opposite the latch head, and comprising at least one roller, the roller being configured to provide a vertical support to the at least one cargo unit in the Z-direction while allowing the movement of the at least one cargo unit in the X-direction. In some such embodiments of the latch, the at least one cargo unit is at least one unit load device (ULD). In some such embodiments of the latch, the latch head comprises a latch toe formed on an edge thereof, the latch toe being configured to engage against a base-latch heel formed in the base plate to secure the latch head within a latch head slot formed in the base plate. In some such embodiments of the latch, the base plate and the latch head comprise corresponding latch-base alignment features, including a protuberance on the base plate and a cavity formed in a bottom surface of the latch head, wherein, when the latch toe is engaged against the base-latch heel, the latch head is configured to pivotably rotate into an installed position, in which the protuberance is located within the cavity. In some such embodiments of the latch, the protuberance comprises a first through-hole formed through a thickness thereof, wherein the latch head comprises a second through-hole formed through a thickness thereof, wherein the first and second through-holes are substantially coaxial to each other when the cavity covers the protuberance, and wherein a pull pin is installed through the first and second through-holes to rigidly attach the latch head against the base plate in the installed position. In some such embodiments of the latch, the roller assembly comprises a frame having a roller toe formed on an edge thereof, the roller toe being configured to engage against a base-roller heel formed in the base plate, adjacent the base-latch heel, to secure the roller assembly to the base plate. In some such embodiments of the latch, the base plate and the roller assembly comprise corresponding roller-base alignment features, including a rib formed on the base plate and a recess formed in a bottom surface of the roller assembly, wherein, when the roller toe is engaged against the base-roller heel, the roller assembly is configured to pivotably rotate into an installed position, in which the rib is located within the recess. In some such embodiments of the latch, the roller-base alignment features comprise at least two slots formed in opposite sides, relative to the X-direction, of the base plate and at least two lateral tabs attached to the roller assembly, wherein each lateral tab is configured to engage within a corresponding slot of the at least two slots when the roller assembly is in the installed position. In some such embodiments of the latch, when the roller assembly is only partially engaged over the base plate, the at least two lateral tabs protrude from the roller base in the X-direction as a visual indicator of the partial engagement of the roller assembly over the base plate. In some such embodiments of the latch, the at least two slots comprise a keyed portion with which the corresponding lateral tabs engage to provide a retention force to prevent, along with the roller toe being engaged with the base-roller toe, separation of the roller assembly from the base plate in the Y-direction and/or the Z-direction. In some such embodiments of the latch, the roller-base alignment features are configured to prevent relative movement between the base plate and the roller assembly in the X-direction.

According to another example embodiment, a method of installing a latch in a cargo management system in a cargo hold is provided, the method comprising: attaching a base plate to a surface within the cargo hold; attaching a latch head to the base plate; and attaching a roller assembly to the base plate. In some such embodiments of the method, attaching the latch head to the base plate comprises: engaging a latch toe against a base-latch heel of the base plate; pivoting the latch head down against the base plate into an installed position, such that a protuberance extending from the base plate towards and/or within a cavity of the latch head is covered; and inserting a pull pin through a first through-hole formed through the protuberance and a second through-hole formed through the latch head, which are substantially co-axial when the latch head is in the installed position. In some such embodiments of the method, pivoting the latch head down against the base plate into the installed position prevents a movement of the latch head relative to the base plate in the X-direction and the Y-direction. In some such embodiments of the method, attaching the roller assembly to the base plate comprises: engaging a roller toe against a base-roller heel of the base plate; and pivoting the latch head down against the base plate, over roller-base alignment features, comprising a rib and slots formed in the base plate and a recess and lateral tabs attached and/or formed in the roller assembly, such that the lateral tabs are located within a slot formed in the base plate. In some such embodiments of the method, the rib and the recess are defined in a Y-Z plane. In some such embodiments of the method, the roller-base alignment features prevent motion of the roller assembly in at least the X-direction relative to the base plate. In some such embodiments of the method, the roller assembly allows a motion of a cargo unit through the Y-Z latch in a substantially frictionless manner. In some such embodiments of the method, the cargo unit is a unit load device (ULD).

According to another embodiment, a system for ensuring proper installation of components of a cargo management system within a cargo hold is disclosed, the system comprising: a plurality of cleats rigidly attached to a floor of the cargo hold, a first subset of the plurality of cleats comprising insets having a first shape, a second subset of the plurality of cleats comprising insets having a second shape, keys and rotatable fasteners attached to the components of the cargo management system, a first subset of the keys having the first shape and a second subset of the keys having the second shape, wherein the first subset of keys can only engage with the first subset of cleats and the second subset of keys can only engage with the second subset of cleats, and wherein the rotatable fasteners are configured for rotary movement to secure the components of the cargo management system to a respective cleat against which the rotary fastener is engaged. In some embodiments of the system, the first and second shapes are different shapes. In some embodiments of the system, the first and second shapes comprise geometric or amorphous shapes. In some embodiments of the system, the geometric shapes comprise one or more of a square, a triangle, a circle, a hexagon, a pentagon, and an hourglass. In some embodiments of the system, each of the cleats comprises a back, through which each cleat is rigidly attached to the cargo hold floor, at least two side walls on opposing lateral sides of the back, and a top surface, against which the rotatable fasteners are tightened to secure the components of the cargo management system to the cleat. In some embodiments of the system, at least one cleat has at least two insets formed through a thickness of the upper surface, into which a corresponding one of the keys can be inserted during installation of the components of the cargo management system. In some embodiments of the system, at least one cleat has a slot formed through a thickness of the upper surface, the slot being continuous and uninterrupted along a length of the cleat to bifurcate the upper surface of the cleat, thereby defining at least two flanges in the cleat. In some embodiments of the system, the rotatable fasteners are configured for insertion through the slot and to engage with an internal surface of the at least two flanges. In some embodiments, the system comprises a tightener for each rotatable fastener, wherein the tightener is configured to clamp the flanges between the rotatable fastener and the component of the cargo management system to which the tightener is attached progressively tighter due to a rotary movement of the tightener. In some embodiments of the system, a width of the rotatable fasteners is less than a distance between the side walls of the cleat.

According to another example embodiment, a method of installing components of a cargo management system is disclosed herein, the method comprising: forming and/or providing insets having a first shape in an upper surface of a first subset of a plurality of cleats; forming and/or providing insets having a second shape in an upper surface of a second subset of the plurality of cleats; rigidly attaching a plurality of cleats to a floor of the cargo hold; attaching keys and rotatable fasteners to the components of the cargo management system, a first subset of the keys having the first shape and a second subset of the keys having the second shape; engaging the first subset of keys with the first subset of cleats; engaging the second subset of keys with the second subset of cleats; and rotating the rotatable fasteners are configured to secure the components of the cargo management system to a respective cleat against which the rotary fastener is engaged. In some embodiments of the method, the first and second shapes are different shapes. In some embodiments of the method, the first and second shapes comprise geometric or amorphous shapes. In some embodiments of the method, the geometric shapes comprise one or more of a square, a triangle, a circle, a hexagon, a pentagon, and an hourglass. In some embodiments of the method, each cleat comprises a back, through which each cleat is rigidly attached to the cargo hold floor, at least two side walls on opposing lateral sides of the back, and a top surface, against which the rotatable fasteners are tightened to secure the components of the cargo management system to the cleat. In some embodiments of the method, at least one cleat has at least two insets formed through a thickness of the upper surface, into which a corresponding one of the keys can be inserted during installation of the components of the cargo management system. In some embodiments of the method, at least one cleat has a slot formed through a thickness of the upper surface, the slot being continuous and uninterrupted along a length of the cleat to bifurcate the upper surface of the cleat, thereby defining at least two flanges in the cleat. In some embodiments, the method comprises inserting the rotatable fasteners through the slot to engage with an internal surface of the at least two flanges. In some embodiments, the method comprises progressively tightening the flanges between the rotatable fastener and the component of the cargo management system to which the tightener is attached by rotating the tightener in a first direction. In some embodiments of the method, a width of the rotatable fasteners is less than a distance between the side walls of the cleat.

According to another example embodiment, a power drive unit (PDU) for transporting cargo units into, out of, and/or within a cargo hold is provided, the PDU comprising: a frame, by which the PDU is rigidly attached to a floor of the cargo hold; a body pivotably attached, via a hinge, at a first end of the frame; at least one drive roller attached at a second end of the body; and an actuator attached to the body and configured to cause a pivoting angular movement of the body, relative to the frame, about the hinge, wherein an angular position of the body relative to the frame is maintained by the actuator even upon a loss of power to the PDU, and wherein the body is configured to move between and including a retracted position and a deployed position. In some embodiments, the cargo units are unit load devices (ULDs) In some embodiments of the PDU, when the body is in the retracted position, the at least one drive roller is positioned entirely below a plane in which a bottom surface of the cargo units travels within the cargo hold so as to not be in contact with the cargo units and, when the body is in the deployed position, the at least one drive roller is positioned such that at least a portion thereof extends coincident to or beyond the plane in which the bottom surface of the cargo units travels within the cargo hold so that the at least one drive roller contacts the cargo units as the cargo units are transported within the cargo hold. In some embodiments of the PDU, the actuator comprises at least one roller having an eccentric shape. In some embodiments of the PDU, the eccentric shape is a substantially ovular shape having a first diameter and a second diameter, the first diameter being different from the second diameter. In some embodiments of the PDU, the first diameter has a size that is smaller than a distance measured from an axis of rotation of the actuator to a bottom surface of the body and the second diameter has a size that is larger than the distance measured from the axis of rotation of the actuator to the bottom surface of the body. In some embodiments of the PDU, an angular velocity of the body relative to the frame increases as the body moves from the retracted position to the deployed position. In some embodiments of the PDU, an angular velocity of the body relative to the frame decreases as the body moves from the deployed position to the retracted position. In some embodiments, the PDU comprises a direct current (DC) brushless motor to reduce or eliminate inrush current and enable transport speed management of cargo units within the cargo hold.

According to another example embodiment, a cargo management system comprising a plurality of the PDUs described hereinabove is disclosed, at least one of the plurality of PDUs comprising a controlled area network (CAN) bus interface to control and communicate with a controller. In some embodiments of the cargo management system, the cargo units are unit load devices (ULDs). In some embodiments of the cargo management system, the at least one PDU is configured to provide predictive maintenance information, including roller health monitoring, operational cycles, and power events of the at least one PDU. In some embodiments, the cargo management system comprises at least one proximity or position sensor adjacent the at least one PDU to detect a latched cargo unit in a stationary position over the PDU. In some embodiments of the cargo management system, the at least one PDU is configured for PIN programming via two PINs at a connector by providing different resistance values thereto. In some embodiments of the cargo management system, the at least one PDU is configured to provide maintenance and operational data via the CAN bus. In some embodiments of the cargo management system, the at least one PDU comprises at least first and second PDUs, the first PDU being installed within the cargo hold in a ball mat area, adjacent a cargo hold door, to transport a cargo unit in a transverse direction of the cargo hold and the second PDU being installed within the cargo hold in the ball mat area to transport a cargo unit in a longitudinal direction of the cargo hold. In some embodiments of the cargo management system, when one or more of the cargo units is being transported in the transverse direction, the body of the first PDU is in the deployed position and the body of the second PDU is in the retracted position. In some embodiments of the cargo management system, when one or more of the cargo units is being transported in the longitudinal direction, the body of the first PDU is in the retracted position and the body of the second PDU is in the deployed position. In some embodiments of the cargo management system, when cargo units are loaded within the cargo hold, the body of the first PDU is moved into or maintained in the deployed position to provide anti-roll-out functionality to a cargo unit within the cargo hold in the ball mat area adjacent the cargo hold door.

According to another example embodiment, a method of transporting cargo units into, out of, and/or within a cargo hold using at least one power drive unit (PDU) is provided, the method comprising: rigidly attaching a frame of the at least one PDU a floor of the cargo hold; pivotably attaching a body of the at least one PDU, via a hinge, at a first end of the frame; attaching at least one drive roller at a second end of the body; driving a pivoting angular movement of the body, relative to the frame, about the hinge using an actuator attached to the body, the angular movement of the body being between and including a retracted position and a deployed position; and maintaining, upon a loss of power to the at least one PDU, an angular position of the body relative to the frame. In some embodiments of the method, the cargo units are unit load devices (ULDs). In some embodiments of the method, when the body is in the retracted position, the at least one drive roller is positioned entirely below a plane in which a bottom surface of the cargo units travels within the cargo hold so as to not be in contact with the cargo units and, when the body is in the deployed position, the at least one drive roller is positioned such that at least a portion thereof extends coincident to or beyond the plane in which the bottom surface of the cargo units travels within the cargo hold so that the at least one drive roller contacts the cargo units as the cargo units are transported within the cargo hold. In some embodiments of the method, the actuator comprises at least one roller having an eccentric shape. In some embodiments of the method, the eccentric shape is a substantially ovular shape having a first diameter and a second diameter, the first diameter being different from the second diameter. In some embodiments of the method, the first diameter has a size that is smaller than a distance measured from an axis of rotation of the actuator to a bottom surface of the body and the second diameter has a size that is larger than the distance measured from the axis of rotation of the actuator to the bottom surface of the body. In some embodiments of the method, an angular velocity of the body relative to the frame increases as the body moves from the retracted position to the deployed position. In some embodiments of the method, an angular velocity of the body relative to the frame decreases as the body moves from the deployed position to the retracted position. In some embodiments of the method, the at least one PDU comprises a direct current (DC) brushless motor to reduce or eliminate inrush current and enable transport speed management of cargo units within the cargo hold. In some embodiments, the method comprises controlling the at least one PDU and communicating with a controller via a controlled area network (CAN) bus interface. In some embodiments, the method comprises providing predictive maintenance information, including roller health monitoring, operational cycles, and power events of the at least one PDU to the controller via the CAN bus. In some embodiments, the method comprises detecting, via at least one proximity or position sensor adjacent the at least one PDU, a latched cargo unit in a stationary position over the PDU. In some embodiments, the method comprises PIN programming the at least one PDU via two PINs at a connector by providing different resistance values thereto. In some embodiments, the method comprises providing maintenance and operational data regarding the at least one PDU via the CAN bus. In some embodiments of the method, the at least one PDU comprises at least first and second PDUs, the method comprising transporting, using the first PDU, which is installed within the cargo hold in a ball mat area, adjacent a cargo hold door, a cargo unit in a transverse direction of the cargo hold and transporting, using the second PDU, which is installed within the cargo hold in the ball mat area, a cargo unit in a longitudinal direction of the cargo hold. In some embodiments of the method, when a cargo unit is being transported in the transverse direction, the body of the first PDU is in the deployed position and the body of the second PDU is in the retracted position. In some embodiments of the method, when a cargo unit is being transported in the longitudinal direction, the body of the first PDU is in the retracted position and the body of the second PDU is in the deployed position. In some embodiments, the method comprises, when all cargo units are loaded within the cargo hold, moving or maintaining the body of the first PDU into the deployed position to provide anti-roll-out functionality to a cargo unit within the cargo hold in the ball mat area adjacent the cargo hold door.

Further features, properties, advantages and possible derivations will be evident to the person skilled in the art from the description below which refers to the attached, example drawings. All features described and/or depicted in the drawings, alone or in arbitrary combinations, indicate the object disclosed herein. The dimensions and proportions of the components shown in the figures are not to scale.

BRIEF DESCRIPTION OF THE DRAWINGS

The disclosure herein will be explained in more detail with reference to figures. The example figures referenced below illustrate schematically:

FIG. 1 is a schematic top view of the points of ingress and egress of an aircraft for passengers, crew, cargo, and the like;

FIG. 17 is an example schematic illustration of PDUs arranged in a cargo hold to provide transverse and longitudinal movement of ULDs therein;

FIG. 30 is an exploded view of the Y-Z latch shown in FIG. 29; and

DETAILED DESCRIPTION

In the description below, without being restricted hereto, specific details are presented in order to give a complete understanding of the disclosure herein. It is, however, clear to a person skilled in the art that the disclosure herein may be used in other example embodiments which may differ from the details outlined below. The figures serve furthermore merely to illustrate example embodiments, are not to scale, and serve merely to illustrate by example the general concept of the disclosure herein. For example, features contained in the figures must not necessarily be considered to be essential components.

Comparable or identical components and features, or those with similar effect, carry the same reference signs in the figures. For reasons of clarity, in the figures sometimes the reference signs of individual features and components have been omitted, wherein these features and components carry reference signs in the other figures.

Figure 1:
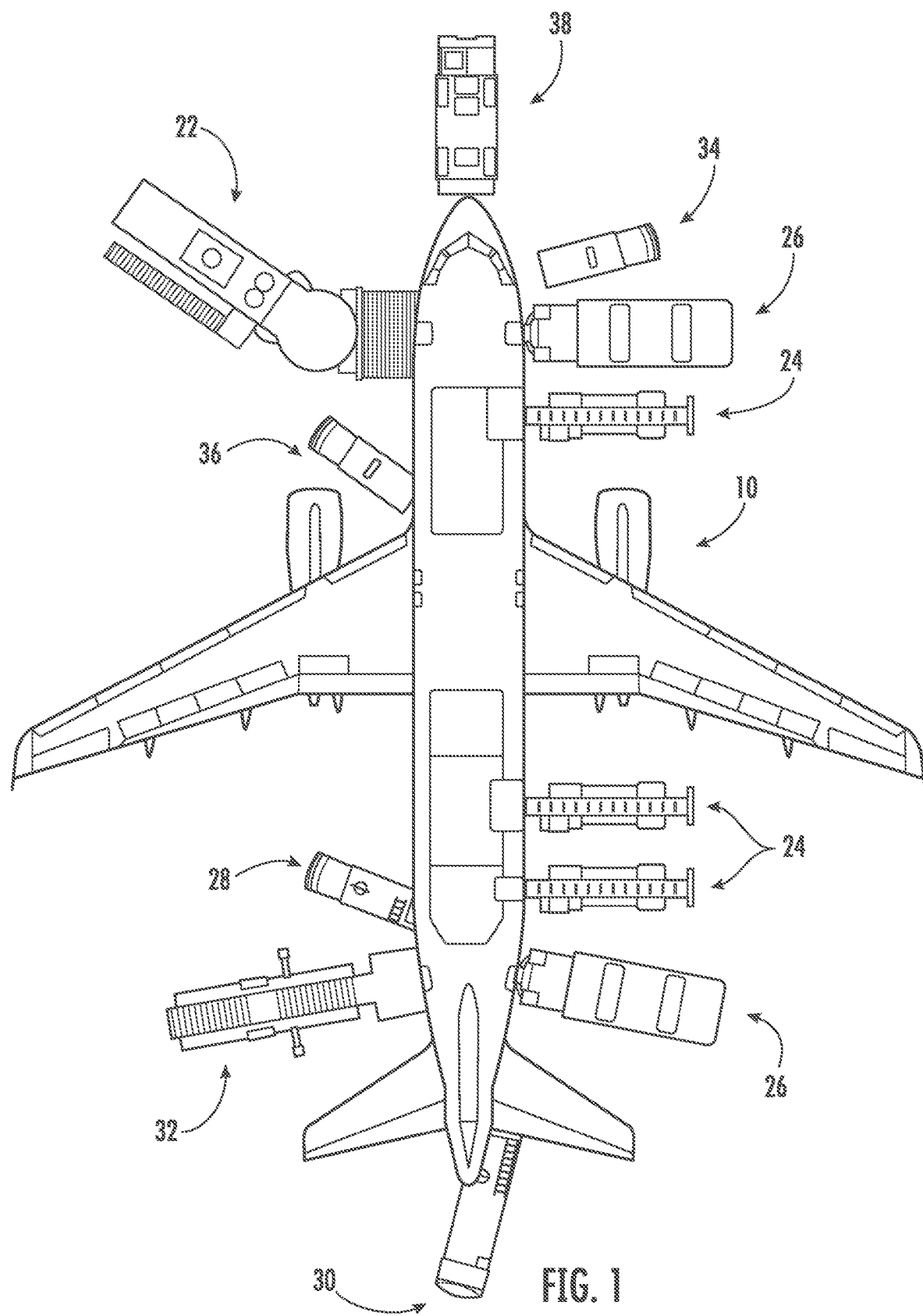

FIG. 1 is a schematic top view of the points of ingress and egress of an aircraft, generally designated 10, for passengers, crew, cargo, and the like while the aircraft 10 is on the ground (e.g., at an airport terminal being resupplied during an aircraft turnaround between flights of the aircraft 10). The aircraft 10 is shown being connected to a plurality of example ground support units and systems. One or more cargo loaders, generally designated 24, can be placed next to the fuselage of the aircraft 10 to load cargo into the cargo hold of the aircraft 10, either manually or in an automated manner. In some embodiments, one or more (e.g., all) of the cargo loaders 24 can be bulk loaders and/or highlifters. In general, one cargo loader 24 will be provided at an entry door to each segregated and/or partitioned portion of a cargo hold in an aircraft 10 where the cargo hold is not continuous along the length of the aircraft 10.

A passenger loading bridge and/or stairway, generally designated 22, is used to allow passengers to walk from an airport terminal onto the aircraft 10. Galley service vehicle, generally designated 26, can be arranged at the fore and/or aft of the aircraft 10 to resupply the galleys of the aircraft 10. A water service vehicle, generally designated 28, can be connected to the aircraft 10 to remove water consumed during a previous flight and to supply fresh water for use by the passengers and/or crew of the aircraft 10 during a subsequent flight. A lavatory service vehicle, generally designated 30, is connected to remove wastewater generated by use of the lavatory of the aircraft 10. A stairway, generally designated 32, may be connected at one or more cabin doors of the aircraft 10 for loading people and/or items from a tarmac of the airport. The aircraft 10 is connected to an electrical ground power unit, generally designated 34, which supplies power to the aircraft 10 while, e.g., the engines of the aircraft 10 are powered down and/or disengaged. An air starting unit or air conditioning vehicle, generally designated 36 is connected to the aircraft to provide conditioned air to the interior of the aircraft for passenger and crew comfort while the aircraft 10 is on the ground with the aircraft engines and associated passenger/crew comfort systems turned off and/or disengaged.

Figure 2:
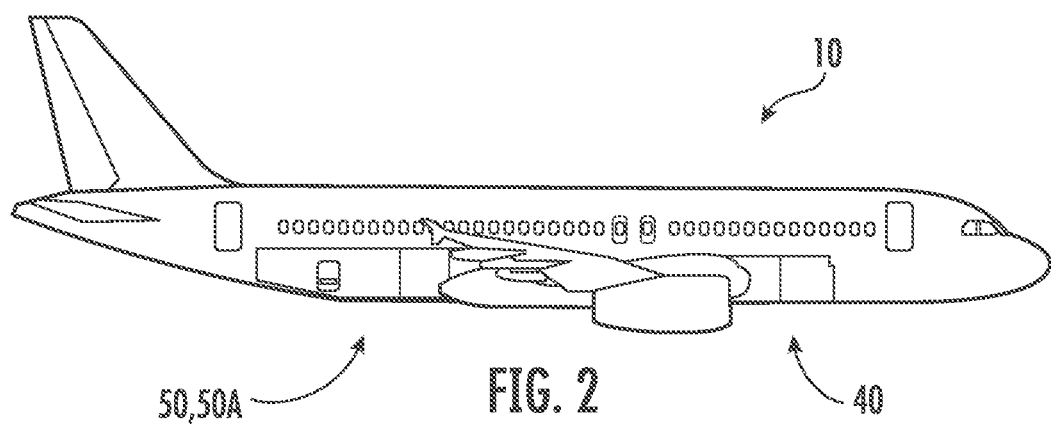
FIG. 2 is an example schematic side view of an aircraft having a plurality of cargo holds.

FIG. 2 is a side view of an example aircraft, generally designated 10, having at least one fore cargo hold, generally designated 40, and primary and auxiliary aft cargo holds, generally designated 50, 50A, respectively.

Figure 3:
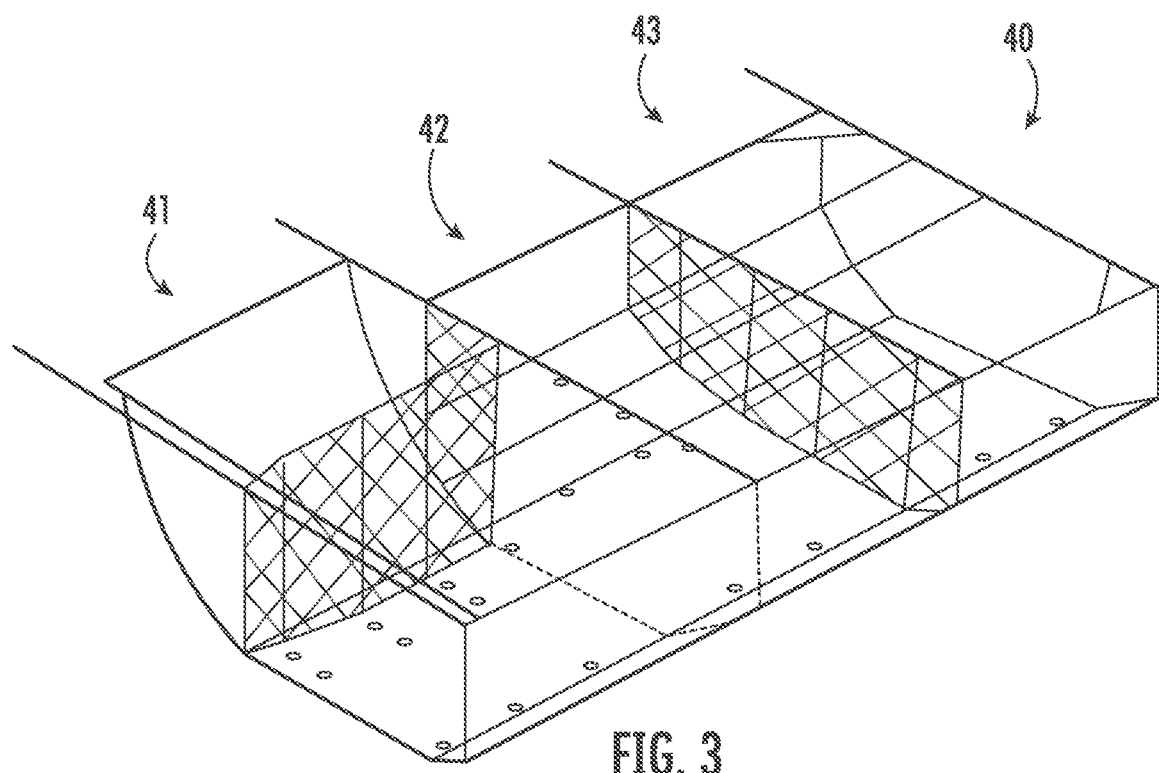
FIG. 3 is an example schematic view of a fore cargo hold shown in the aircraft of FIG. 2.

FIG. 3 shows an example embodiment of a fore cargo hold 40 which has been segmented, whether virtually, through use of attachment components to secure cargo only at particular locations within the fore cargo hold 40, and/or by physical partitions and/or segmentation of the fore cargo hold 40. As shown, the fore cargo hold 40 is subdivided into a first fore cargo area, generally designated 41, a second fore cargo area, generally designated 42, and a third fore cargo area, generally designated 43. In general, it is advantageous for any such physical partitions and/or segmentation within the fore cargo hold 40 to be removable and/or configurable (e.g., not fixed in place) to allow for movement of cargo loaded at one end of the fore cargo hold 40, e.g., in first fore cargo area 41, to be moved into another cargo area within the fore cargo hold 40, whether the second fore cargo area 42 or the third fore cargo area 43. The fore cargo hold 40 may be subdivided into any desirable number and size areas (e.g., a plurality of such areas) as is desired based on the cargo configuration that the aircraft is intended to transport.

Figure 4:
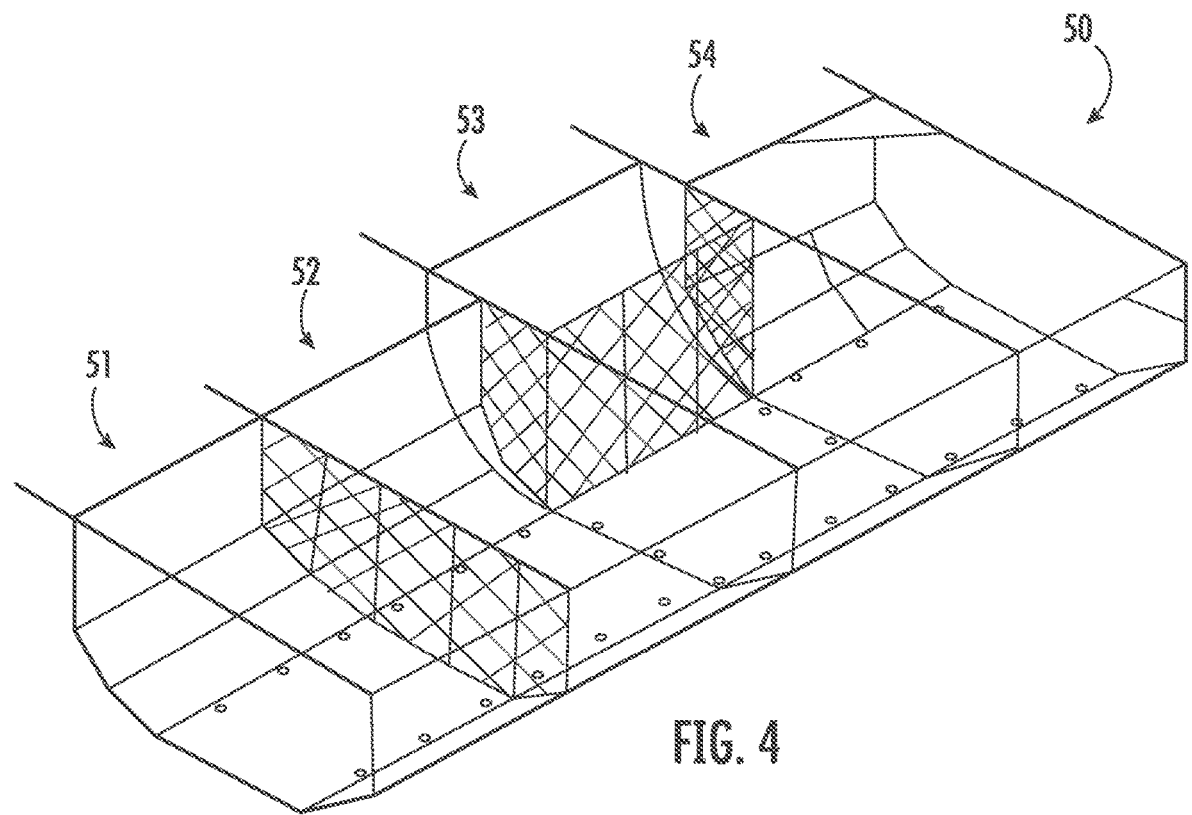
FIGS. 4 and 5 are example schematic views of the aft cargo holds shown in the aircraft of FIG. 2.

FIG. 4 shows an example embodiment of a primary aft cargo hold 50 which has been segmented, whether virtually, through use of attachment components to secure cargo only at particular locations within the primary aft cargo hold 50, and/or by physical partitions and/or segmentation of the primary aft cargo hold 50. As shown, the primary aft cargo hold 50 is subdivided into a first primary aft cargo area, generally designated 51, a second primary aft cargo area, generally designated 52, a third primary aft cargo area, generally designated 53, and a fourth primary aft cargo area, generally designated 54. In general, it is advantageous for any such physical partitions and/or segmentation within the primary aft cargo hold 50 to be removable and/or configurable (e.g., not fixed in place) to allow for movement of cargo loaded at one end of the primary aft cargo hold 50, e.g., in first primary aft cargo area 51, to be moved into another cargo area within the primary aft cargo hold 50, whether the second primary aft cargo area 52, the third primary aft cargo area 53, or the fourth primary aft cargo area 54. The primary aft cargo hold 50 may be subdivided into any desirable number and size areas (e.g., a plurality of such areas) as is desired based on the cargo configuration that the aircraft is intended to transport.

Figure 5:
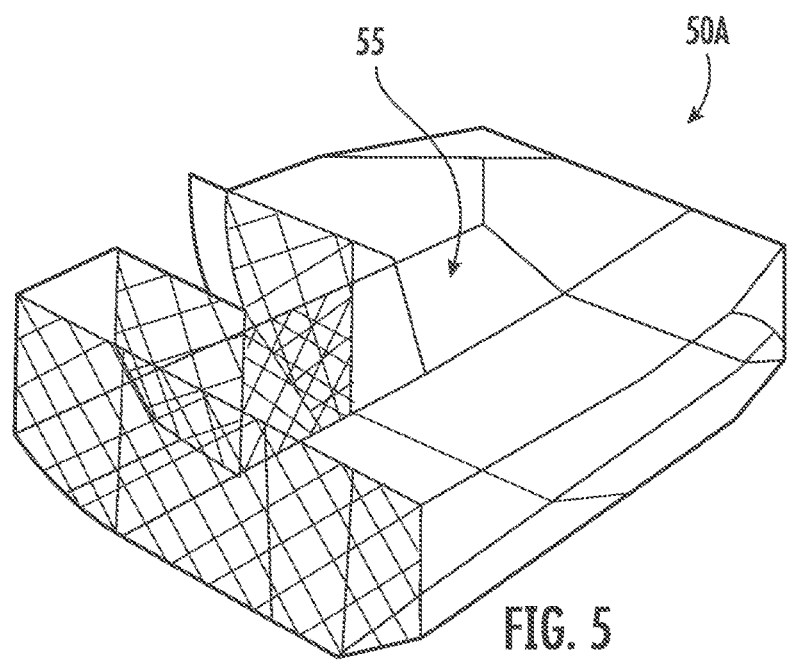

FIG. 5 shows an example embodiment of an auxiliary aft cargo hold 50A, which can be physically segregated from, and have a separate loading door from, the primary aft cargo hold 50, and/or which can be physically connected and segregated, either virtually, as described elsewhere herein, or physically with a barrier, which can be permanent or, advantageously, removable. In the embodiment show, the auxiliary aft cargo hold 50A has only a single auxiliary aft cargo area, generally designated 55, but may be subdivided into any desirable number and size areas (e.g., a plurality of such areas) as is desired based on the cargo configuration that the aircraft is intended to transport.

Figure 6:
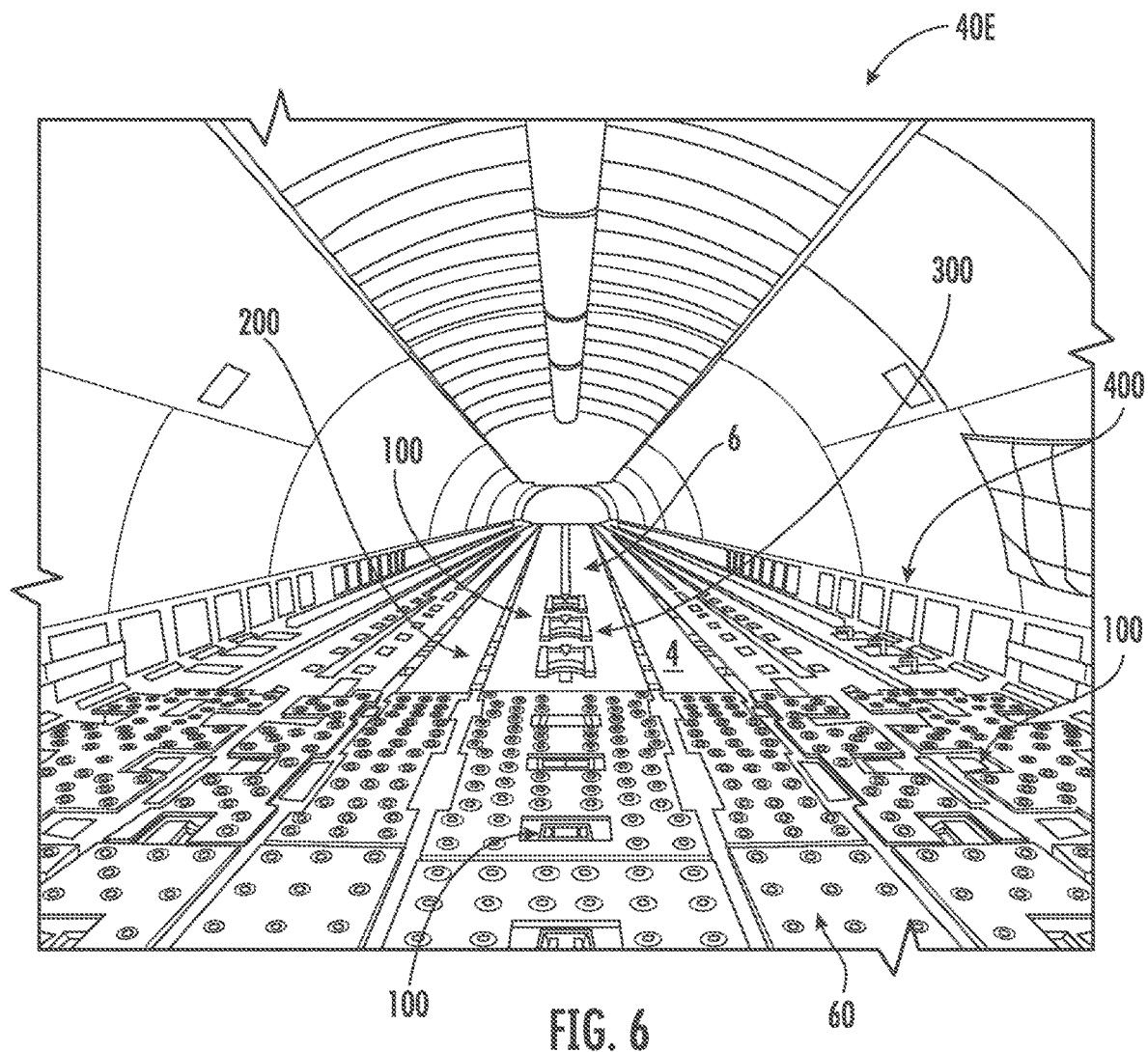
FIG. 6 is an image of an example image of a cargo hold in an aircraft configured as a cargo aircraft.
Figure 7:
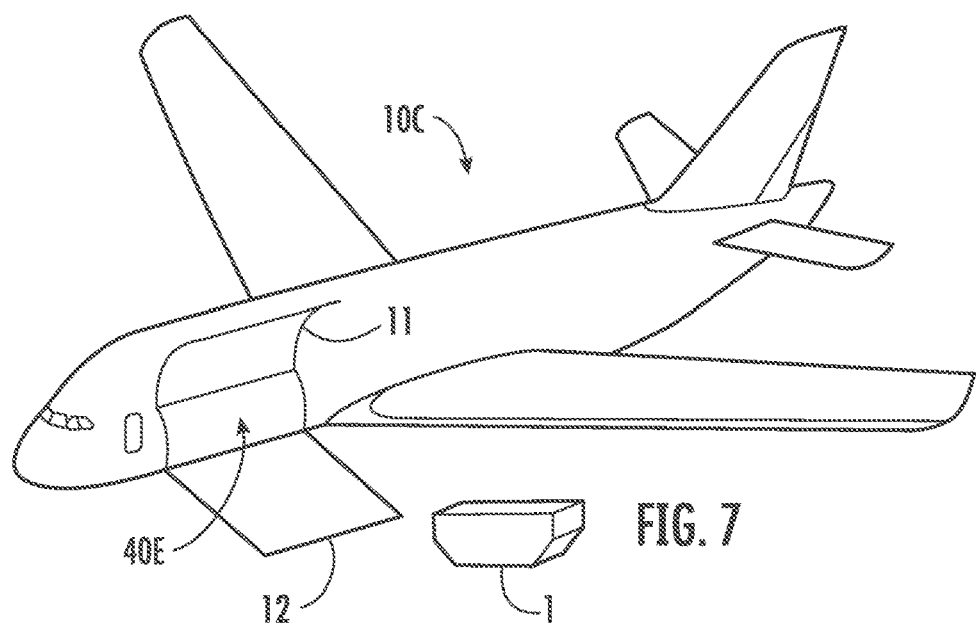
FIG. 7 is an example schematic view of a cargo aircraft configured to receive one or more ULDs within its cargo hold.
Figure 8:
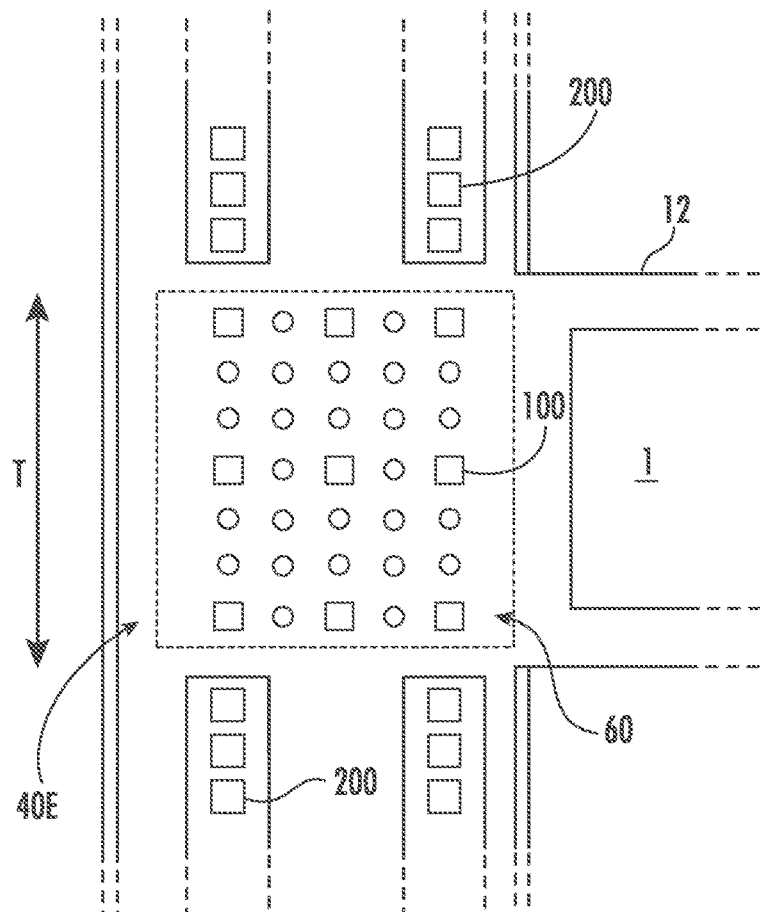
FIG. 8 is an example top view of an embodiment of a cargo floor within a cargo hold of an aircraft.
Figure 9:
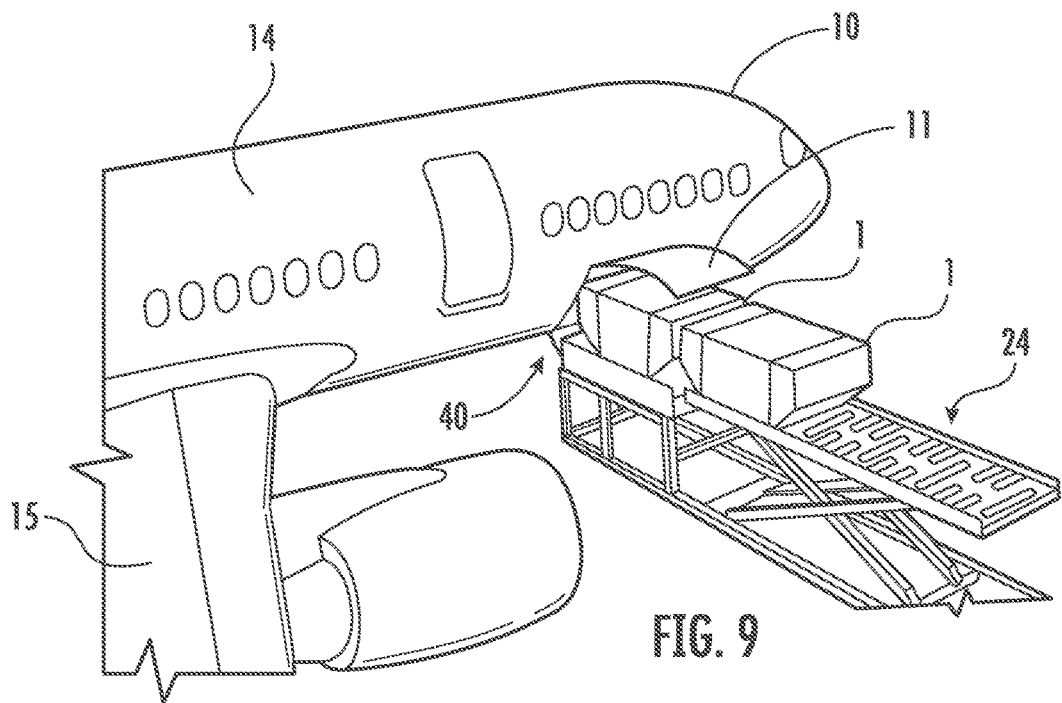
FIG. 9 is an example schematic view of a cargo aircraft configured to receive one or more ULDs within its cargo hold.
Figure 10:
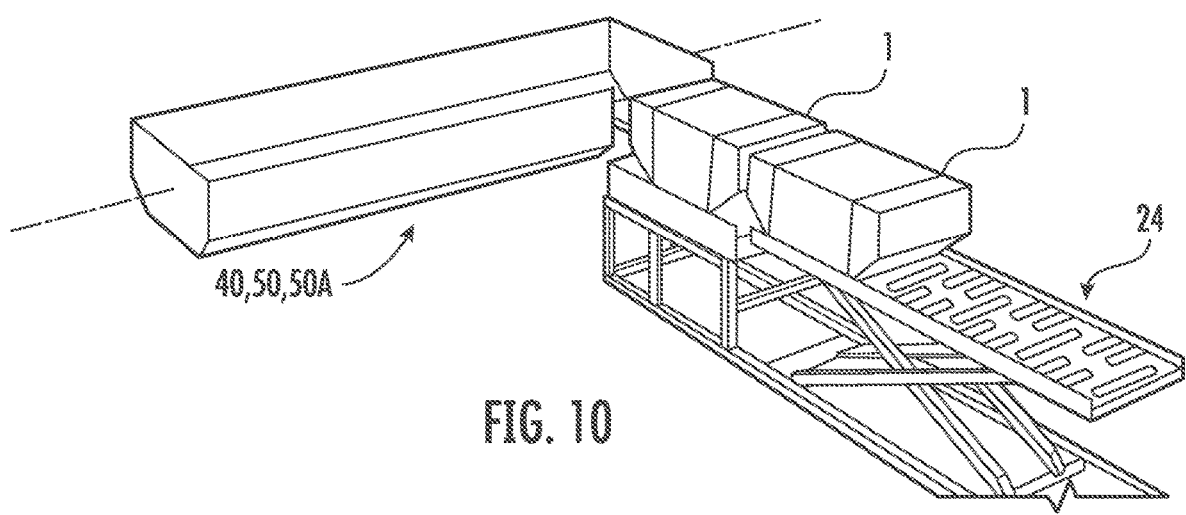
FIG. 10 is an isolated schematic view of a cargo hold from the aircraft shown in FIG. 9, the cargo hold being configured to receive one or more ULDs therein.

FIG. 6 is an interior illustration of an example embodiment of an aircraft cargo hold 40E configured as a cargo aircraft (see 10C, FIG. 7), having roller assemblies, generally designated 200, power drive units (PDUs), generally designated 100, X-Z latches, generally designated 300, and Y-Z latches, generally designated 400, arranged along the length of the cargo hold 40E and one or more ball mats 60 installed on the cargo floor 4 of the cargo hold 40E. There may be a plurality of ball mats 60, but regardless of the number, the ball mats 60 allow for multi-dimensional motion of the cargo units, which are shown in FIGS. 7-10 as unit load devices (ULDs), but which may be any type of cargo unit, including, for example, palletized freight, at the entry of the cargo hold 40E adjacent the door through which cargo is loaded and unloaded from the cargo hold 40E. FIG. 7 is an exterior schematic view of the example cargo aircraft, generally designated 10C, of FIG. 6, in which the cargo aircraft 10C has only a minimal or no passenger area, the majority of the interior space of the cargo aircraft 10C. In the embodiment shown, the cargo hold 40E is accessed through a cargo door 11, by which a cargo unit 1 is loaded onto the aircraft via a loading ramp 12. FIG. 8 schematically shows an example embodiment of a portion of a cargo hold 40E, showing the roller assemblies 200, PDUs 100, and ball mat 60 arranged at the entrance of the cargo hold 40E of such a cargo aircraft as is shown in FIGS. 6 and 7. The cargo unit 1 is loaded via the loading ramp 12 onto the ball mat 60 and can then be driven in either direction along the longitudinal axis of the aircraft, the direction being generally designated T, such that the cargo unit 1 can be moved in the fore or aft direction within the cargo hold 40E. FIGS. 9 and 10 schematically show another example embodiment of a passenger aircraft 10 with a fore cargo hold 40 located underneath the passenger cabin 14 and in front of the wing 15 of the aircraft. A cargo loader 24 is provided to load the cargo units 1 into the fore cargo hold 40 through the cargo door 11, then the cargo units 1 are moved along the length of the fore cargo hold 40 to a position designated so that all of the cargo units 1 can be loaded into the fore cargo hold 40.

Figure 11:
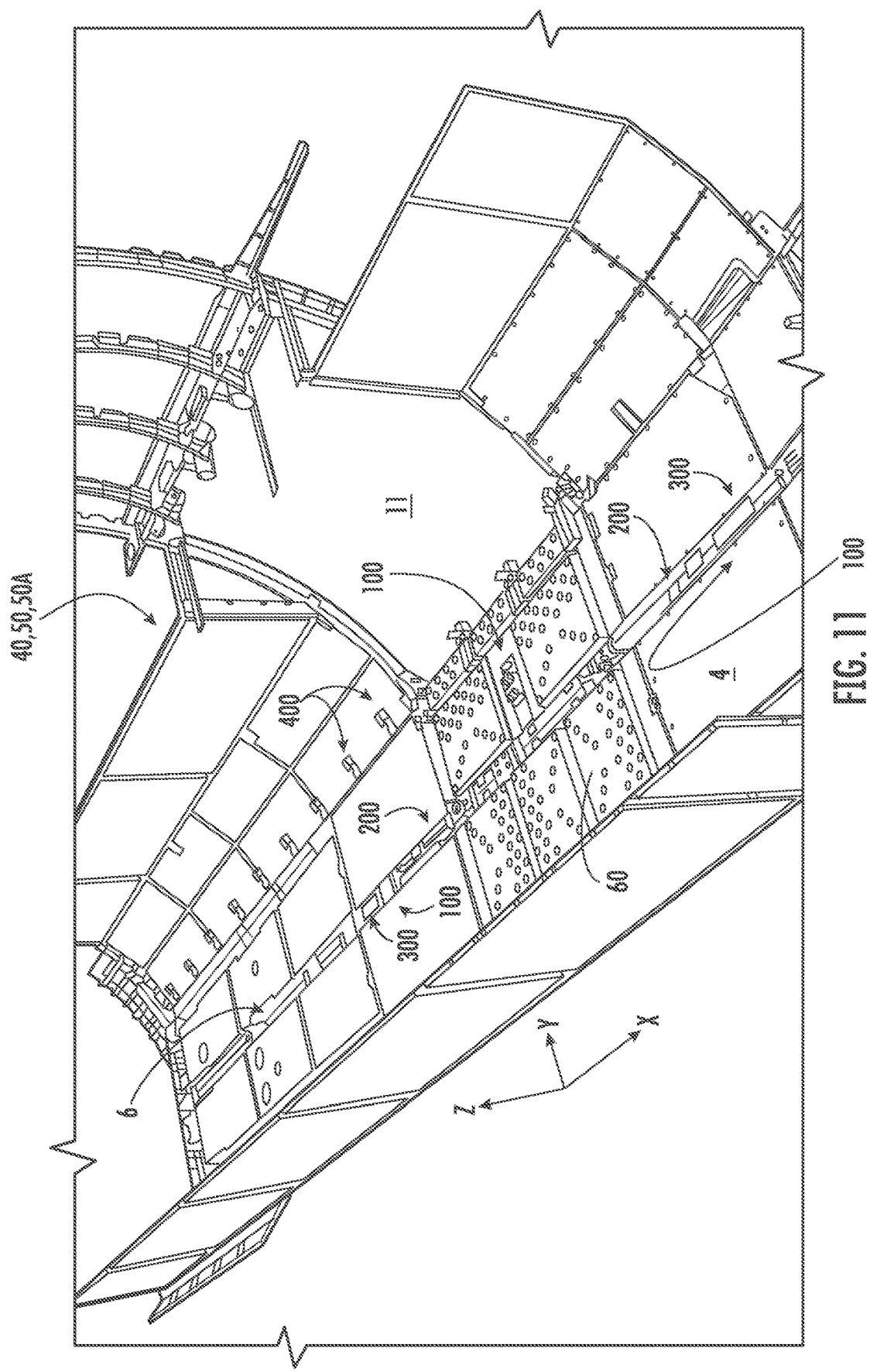
FIG. 11 is an example embodiment of a cargo hold configured to receive cargo containers in the form of ULDs.
Figure 12:
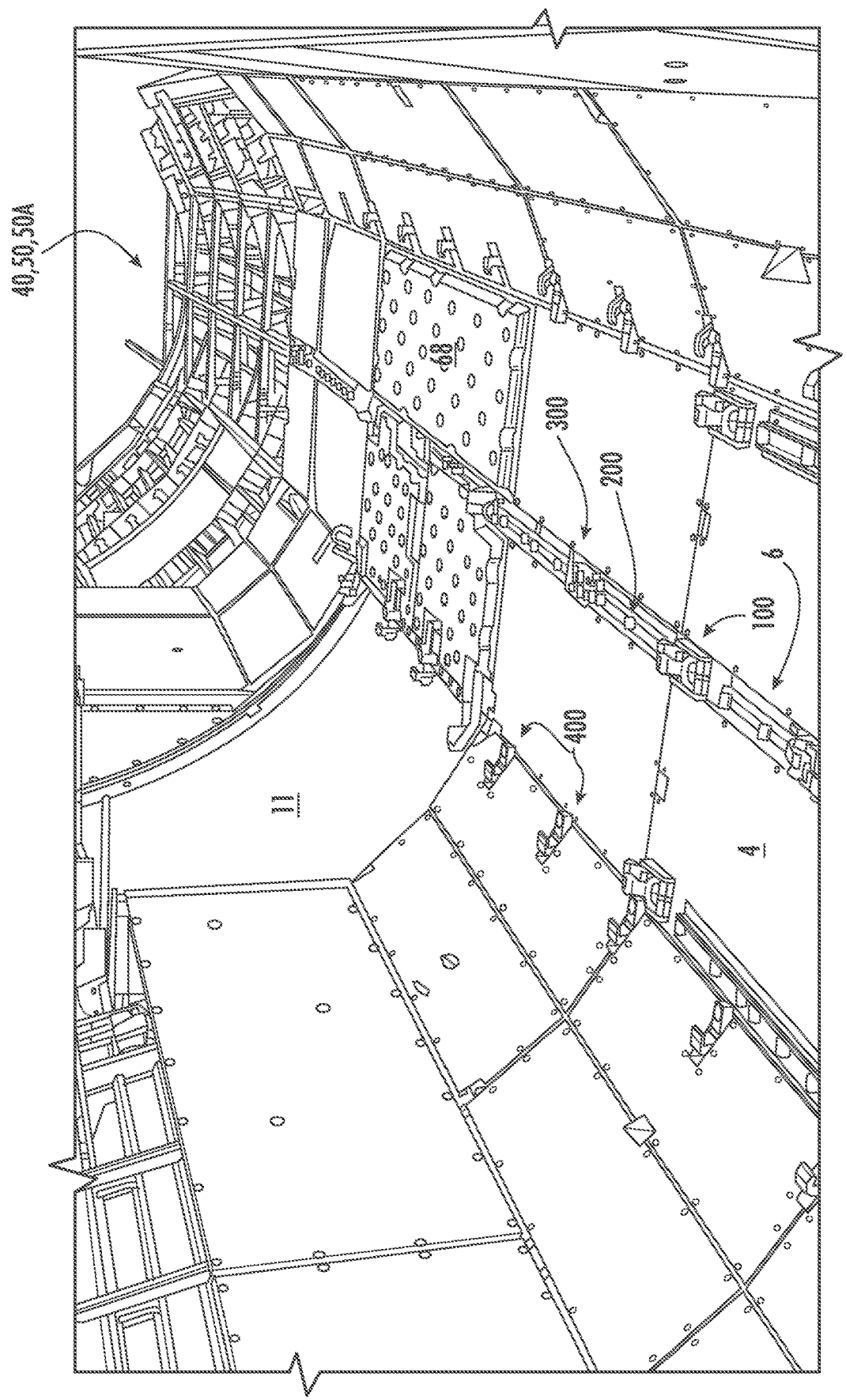
FIG. 12 is another view of the example embodiment of the cargo hold from FIG. 11.

FIGS. 11 and 12 show another example embodiment of a cargo hold 40, 50, 50A, that has a floor 4 and is accessible through a cargo door 11. While the example embodiment shown is a cargo hold underneath a passenger cabin of an aircraft, the foregoing descriptions apply equally in a cargo hold (e.g., 40E, FIGS. 6 and 7) of a cargo aircraft (e.g., 10C, FIG. 7). Adjacent the cargo door 11, a plurality of ball mats 60 are installed in and/or on the floor 4 of the cargo hold 40, 50, 50A. A main drive rail 6 is arranged along all or at least a portion of (e.g., a majority of) the length of the cargo hold 40, 50, 50A. PDUs, generally designated 100, roller assemblies, generally designated 200, and/or X-Z latches, generally designated 300, are arranged along the main drive rail 6. In some embodiments, the cargo hold 40, 50, 50A may have a plurality of substantially parallel main drive rails 6, the term "substantially parallel" meaning that the main drive rails 6 are parallel to each other within a tolerance of the construction methods used in the construction of the cargo hold 40, 50, 50A. The PDUs 100 and/or X-Z latches 300 can be installed within the area where the ball mat(s) 60 are located. The PDUS 100 are configured to move the cargo (e.g., the cargo units 1, see FIGS. 9 and 10) along the length of the cargo hold 40, 50, 50A. The Y-Z latches, generally designated 400, are located along the lateral edges of the floor 4 of the cargo hold 40, 50, 50A so as to not block movement of the cargo along the length of the cargo hold 40, 50, 50A to and/or from a designated stowage position. The Y-Z latches 400 are therefore arranged at preset intervals and spaced apart from each other along the longitudinal axis of the aircraft. Each X-Z latch 300 can be spring-loaded and actuatable to prevent motion of the cargo against which the X-Z latch 300 is engaged in the X-direction (e.g., along the length of the aircraft) and the Z-direction (e.g., the vertical direction).

Figure 13:
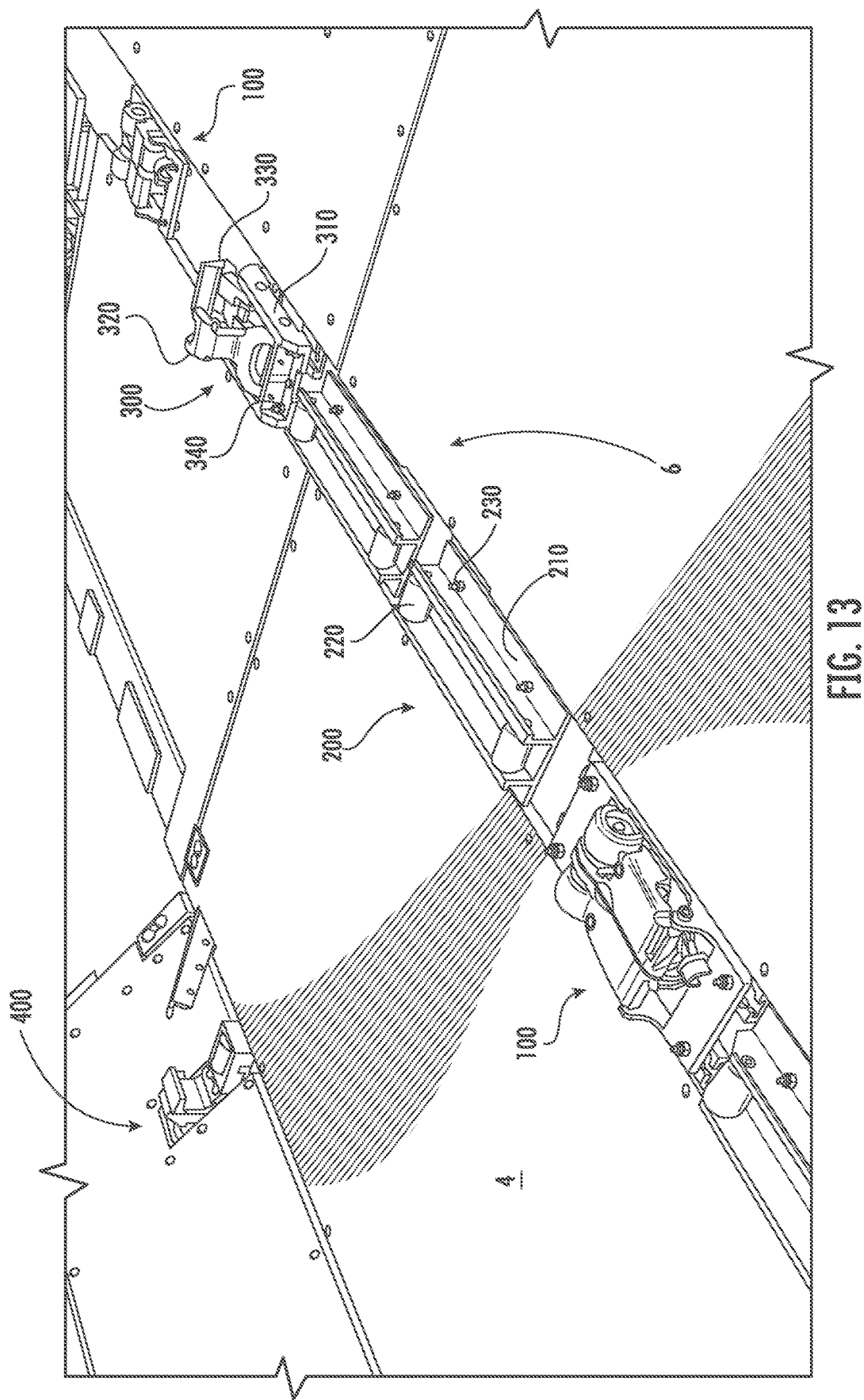
FIG. 13 is a detailed view of components of the cargo management system installed along a main drive rail within the cargo hold of FIGS. 11 and 12.

FIG. 13 shows an example embodiment of a main drive rail 6 installed in a cargo hold, such as is shown in FIGS. 11 and 12, with a plurality of PDUs 100, roller assemblies 200, X-Z latches 300, Y-Z latches 400, and the like attached thereto in a designated configuration to facilitate movement and retention of cargo units (see, e.g., 1 in FIGS. 9 and 10) within the cargo hold in which the main drive rail 6 is installed. The main drive rail 6 can extend up to, or into, the ball mat (60, see FIGS. 11 and 12) or other suitable analogue located adjacent the entry to the cargo hold (e.g., at the cargo door 11), and is configured to transport ULDs, once they are loaded within the cargo hold, to a designated position within the cargo hold for transport to a destination by the aircraft. The roller assemblies 200 are configured to allow for substantially frictionless, at least compared to a sliding surface interface, movement of cargo along the length of the cargo hold, but are idler rollers, meaning that the rollers of the roller assemblies 200 are not driven, however, in some embodiments, one or more of the rollers of one or more of the roller assemblies 200 can be driven, rather than idler, rollers.

The PDUs 100 are configured with a one or a plurality of driven rollers 140 that engages against a surface (e.g., a bottom surface) of the cargo to move the cargo by a frictional rotation of the driven roller 140 against the cargo. The Y-Z latches 400 are typically installed about the perimeter of the cargo hold and configured to engage with a laterally extending flange of the cargo unit (e.g., of the ULD) passing through the cargo hold to prevent relative movement of the cargo within the cargo hold in the Y- and Z-directions. The X-Z latches 300 are typically installed along the main drive rail 6 at a designated spacing (e.g., pitch) based on the length of the ULDs (e.g., as measured in the X-direction) and are configured to engage with a flange of the cargo unit about which the latch is engaged to prevent relative movement of the cargo unit within the cargo hold in the X- and Z-directions. The X-Z latches 300 are typically spring-loaded and movable between and including deployed and retracted positions. In the retracted positions, the components of the X-Z latch are all located beneath the plane in which the cargo unit travels (e.g., beneath the top surface of the roller assemblies 200 and/or PDUs 100) so that the cargo units can pass over the X-Z latches 300 without any physical contact occurring between the cargo units and the X-Z latches 300. In the deployed positions, the X-Z latches have a generally hooked shape (e.g., in the shape of an inverted L) that engage over (e.g., in the Z-direction) and against (e.g., in the X-direction) the flange of the cargo unit to prevent further movement of the cargo unit in the X- and Z-directions beyond the surfaces of the X-Z latch 300 where it contacts the flange of the cargo unit.

Figure 14:
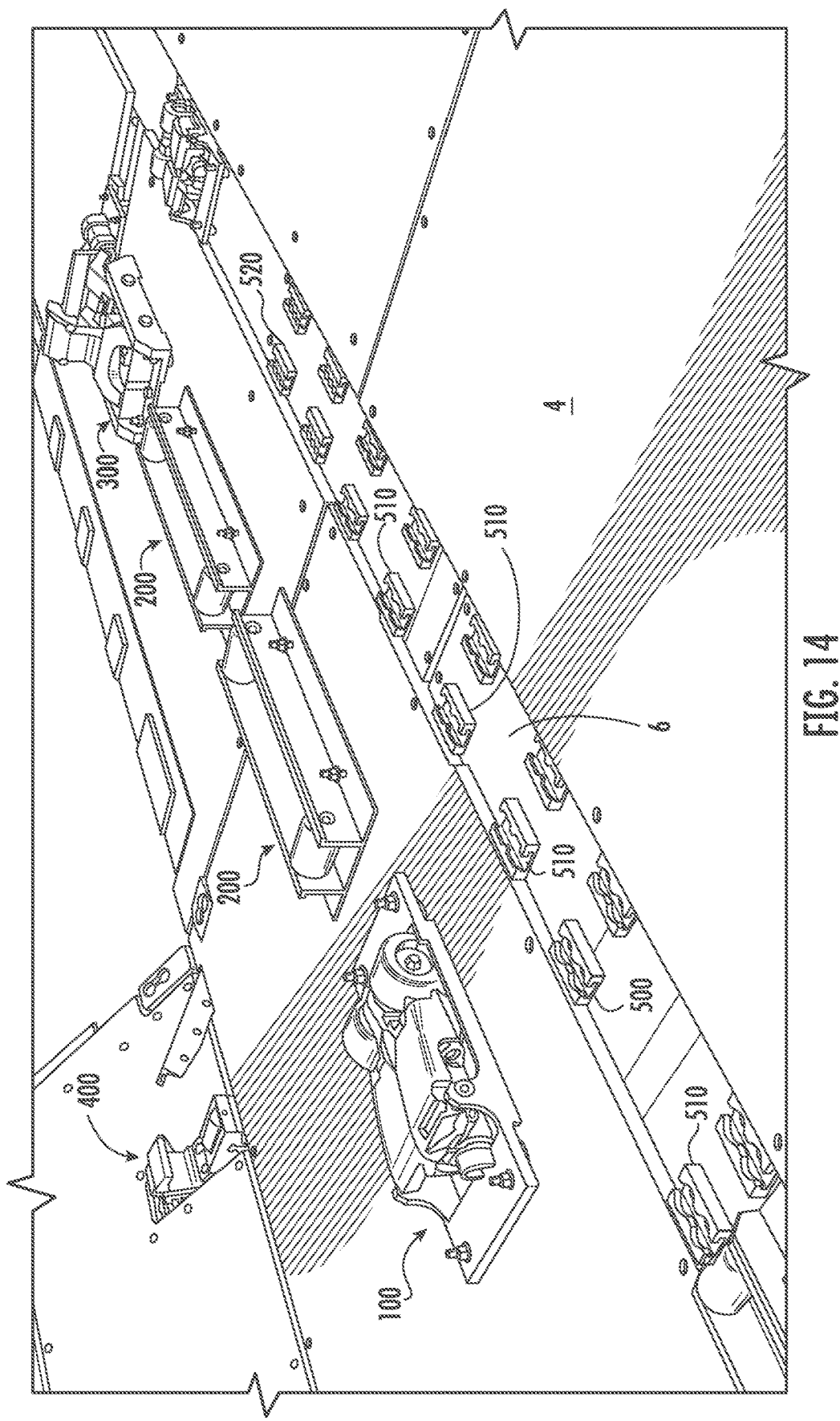
FIG. 14 is an exploded view of FIG. 13, showing the attachment cleats used to removably secure the components of the cargo management system along the main drive rail.

FIG. 14 is a partially exploded view of the main drive rail 6 shown in FIG. 13, showing the PDUs 100, roller assemblies 200, and X-Z latches 300 spaced vertically away from the main drive rail 6, thereby showing the attachment cleats 500, 510, 520 used to define which of the PDUs 100, roller assemblies 200, and X-Z latches 300 can be installed based on an installation pattern of the cleats 500, 510, and 520 on the main drive rail 6. Each cleat 500, 510, and 520 has, as viewed cross-sectionally along the X-direction, a generally C-shape with a back portion attached to the cargo hold floor 4 at designated positions, side walls extending away from the lateral edges of the back portion in the Z-direction, perpendicular to the X-Y plane defining the cargo hold floor 4, and flanges that are spaced vertically apart from, but substantially parallel to, the cargo hold floor 4 and the back portion of the cleat 500, 510, and 520. In some embodiments, the flanges are separated by a slot that is uninterrupted along the length of the cleat 500, 510, and 520. In some embodiments, the flanges are in the form of a unitary top surface with inset shapes formed through a thickness (e.g., in the Z-direction) of the cleat 500, 510, and 520. These insets can be formed in any shape, including, for example, circle, triangle, square, and hourglass, as shown in FIGS. 24A-24D. Other examples can include pentagons, hexagons, or any shape, including non-geometric shapes. Other amorphous shapes are contemplated and envisioned in accordance with the disclosure herein as well.

Figure 15:
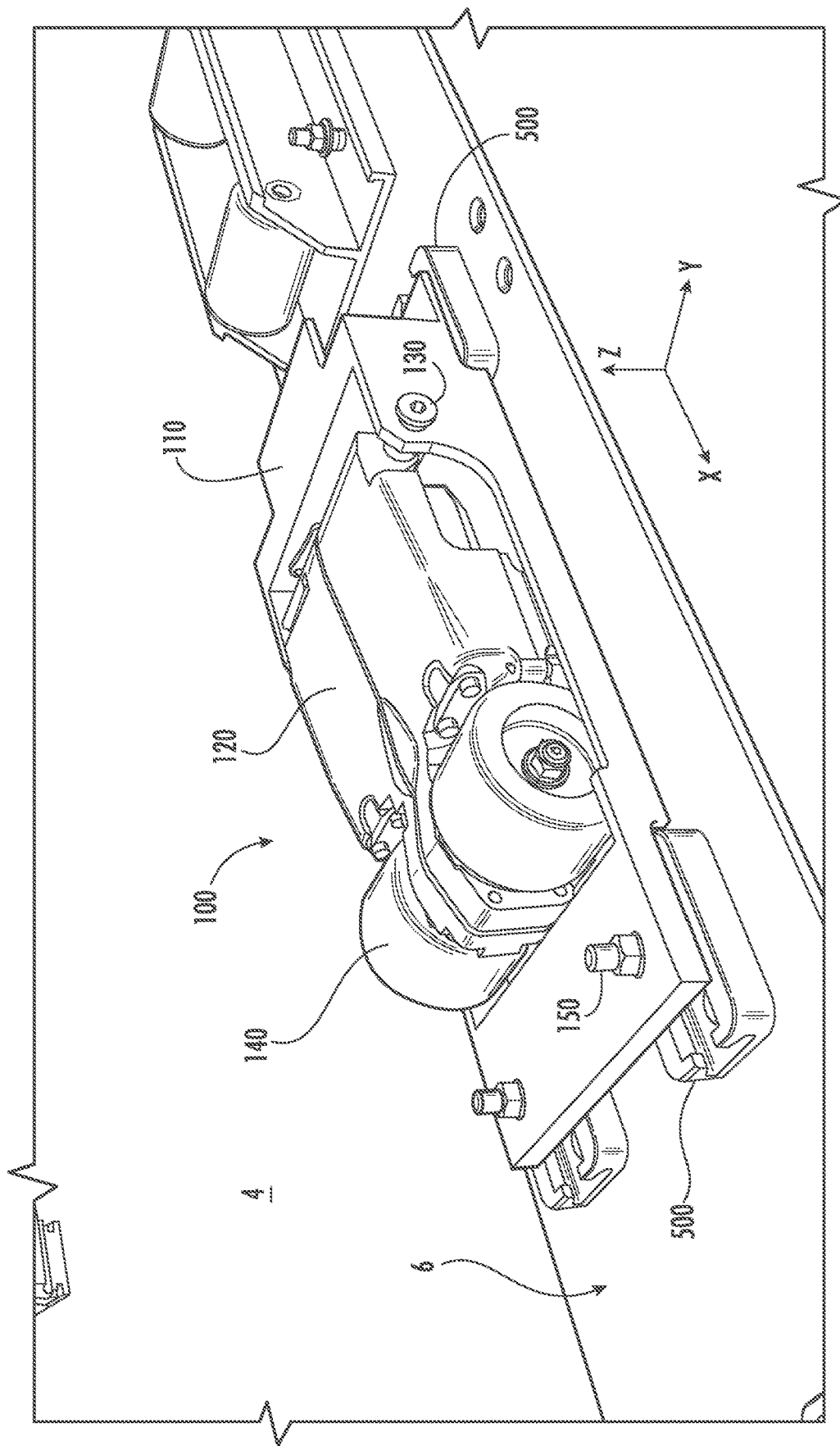
FIG. 15 is an example view showing a power drive unit (PDU) installed at a designated position along the main drive rail.

FIG. 15 is a schematic illustration of an example embodiment of a PDU, generally designated 100, having a base 110 that is connectable to the main drive rail 6 within the cargo hold, a body 120 that is connected to the base at a pivoting connection point 130, and one or more (e.g., a plurality of) drive rollers 140 that are rotatably driven (e.g., on demand) about an axis. The body 120 of a PDU 100 is typically spring-loaded to be biased in the vertical direction, away from the cargo hold floor 4, to ensure proper engagement of the drive roller(s) 140 against the bottom surface of the cargo unit being transported within the cargo hold. The PDU 100 is configured to rotate the drive roller(s) 140 in either direction to facilitate movement of the cargo units in both directions relative to the longitudinal orientation of the PDU 100, thereby enabling both loading and unloading of the cargo units into and out of the cargo hold of the aircraft.

Figure 16A:
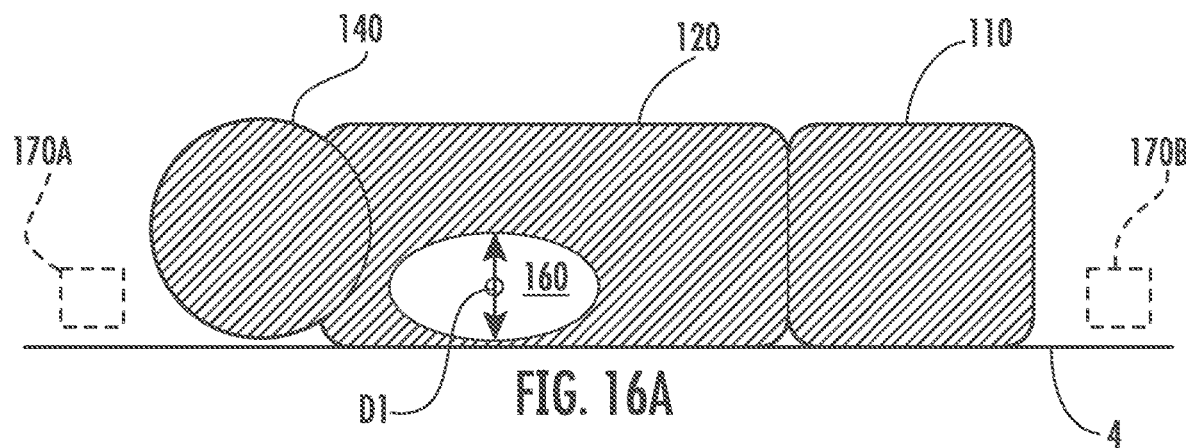
FIG. 16A is a schematic illustration of an example embodiment of a bi-stable PDU in a retracted position.
Figure 16B:
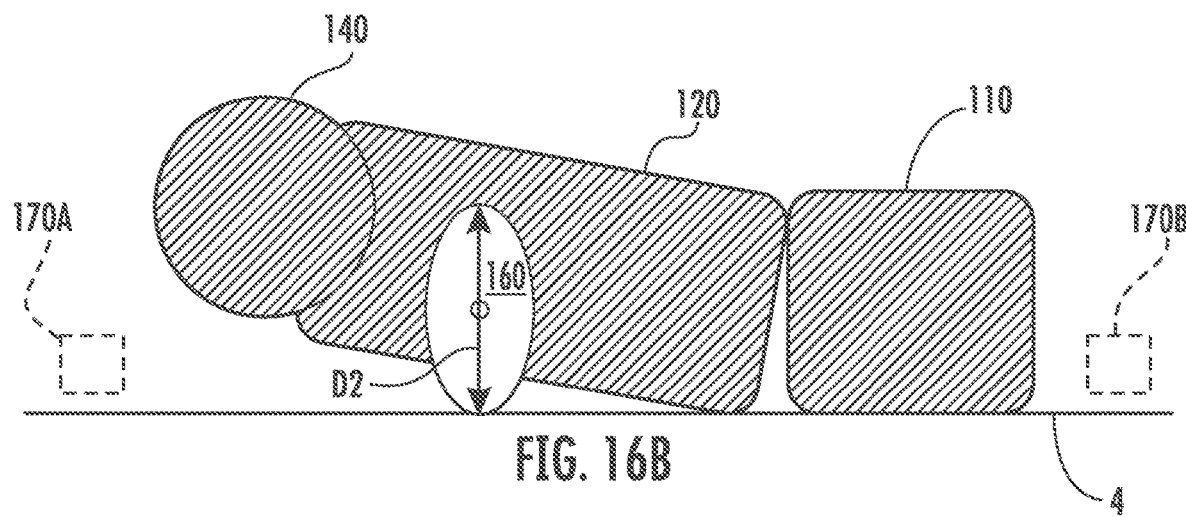
FIG. 16B is a schematic illustration of the bi-stable PDU of FIG. 16A in a deployed position.

In the example embodiment of the PDU 100 shown in FIGS. 16A and 16B, the PDU 100 has a DC brushless motor, controlled area network (CAN) bus interface, speed control management, bi-stable roller positioning, and predictive maintenance data collection. Such PDUs 100 can be used as a replacement for the door sill latches previously implemented to provide anti-roll-out functionality. As shown, the PDU 100 of FIGS. 16A and 16B has, to enable the bi-stable functionality, an integrated eccentrically-shaped actuator 160 (e.g., a roller) that can be controlled between at least two angular positions. Due to the eccentric shape of the actuator 160, which has a substantially ovular shape, the angular position of the body 120, relative to the base 110 and the cargo hold floor 4, can be changed merely by a rotational movement of the actuator 160. The actuator 160 can be a single roller, a plurality of rollers, one or more wheels, or any combination thereof or of any components capable of operating in such a manner.

In the embodiment shown, a first diameter D1 of the actuator 160 has a size such that it does not extend beyond the lower edge of the body 120 of the PDU 100 when the actuator 160 is in the first (e.g., retracted) position shown in FIG. 16A, such that the drive roller 140 is in a position beneath a plane in which the bottom surface of the cargo units travels, so that the drive roller 140 is not in contact with the cargo units when the first diameter D1 of the actuator is perpendicular to the cargo hold floor 4, as shown in FIG. 16A. Due to its eccentric shape, the actuator 160 has a second diameter D2 that is larger than a distance from the axis of rotation of the actuator 160 to the bottom surface/edge of the body 120 of the PDU 100, such that the body 120 is moved into a non-zero angular position relative to the cargo hold floor 4 when the second diameter D2 is oriented perpendicularly to the cargo hold floor 4, as shown in FIG. 16B. In the deployed position, when the drive roller 140 is in contact with the cargo unit, the PDU 100 is able to control a movement (and rate of movement) of the cargo unit with which it is in contact; thus, the PDU 100 is capable of holding, stopping, or transporting a cargo unit within the cargo hold. Such holding functionality causes the PDU 100 to actively resist movement of the cargo unit from the position in which it is being held by preventing angular movement of the drive roller 140. Such stopping functionality brings the cargo unit to a stop (e.g., having zero velocity relative to the cargo hold in which it is located) but may not actively resist further movement of the cargo unit. Such transporting functionality causes a movement of the cargo unit within the cargo hold. It is further contemplated that the PDU 100 may be only partially deployed in some instances by only a partial rotation of the actuator 160 of less than 90° from the position in which the first diameter D1 is perpendicular to the cargo hold floor 4. In case of power loss, the drive roller 140 will remain safe in the last position (e.g., retracted or deployed, meaning that the actuator 160 will not return to a "home" or "rest" position). The drive roller 140, when in the deployed position, therefore provides a braking force to hold the cargo unit even during a power loss scenario, but the cargo unit may be manually moved (e.g., pushed or pulled) over the PDU 100 in such scenarios.

The eccentric shape provides a smooth motion profile to the movement of the drive roller 140, relative to the cargo hold floor 4. When moving from the retracted position of FIG. 16A into the deployed position of FIG. 16B, the initial rotary movement of the actuator 160 initially produces a rate of travel of the drive roller 140 away from the cargo hold floor 4 that increases as the actuator 160 is progressively turned (e.g., assuming a constant angular velocity). Thus, a vertical velocity of the drive roller 140 from the retracted position to the deployed position increases, assuming the angular velocity of the actuator 160 remains constant, as the position of the drive roller 140 moves progressively further away from the retracted position. Similarly, when moving the drive roller 140 from the deployed position shown in FIG. 16B into the retracted position shown in FIG. 16A, the initial rotary movement of the actuator 160 initially produces a rate of travel of the drive roller 140 towards the cargo hold floor 4 that decreases as the actuator 160 is progressively turned. Thus, a vertical velocity of the drive roller 140 from the deployed position to the retracted position decreases, assuming the angular velocity of the actuator 160 remains constant, as the position of the drive roller 140 moves progressively closer to the retracted position.

In some embodiments, the PDU 100 is configured to perform predictive maintenance, for example, by detecting the condition of the material (e.g., rubber) of the drive roller 140 for roller health monitoring, operational cycles, and power events. Furthermore, one or more (e.g., a plurality of) proximity or position sensors 170A, 170B may be provided in or adjacent to the PDU 100 (e.g., fore and/or aft thereof) to detect a latched cargo unit in a position over, at least partially, the PDU 100. The PDU 100 is further configured for PIN programming via two PINs at a connector by providing different resistance values (e.g., by controlling a value of a variable resistor). A CAN bus interface can be provided to control the operation of the PDU 100 (e.g., the angular position of the actuator 160 and the angular velocity of the drive roller 140) and enable communication of the PDU 100 with a cargo management system control unit (e.g., a controller). In such embodiments utilizing a CAN bus interface, the PDU 100 is configured to send maintenance and operational data via the CAN bus. In some embodiments, the PDU 100 is configured to have a DC brushless motor to drive the actuator 160 and/or the drive roller 140 to reduce (e.g., eliminate) inrush current and enable transport speed management of the cargo units within the cargo hold by controlling the angular speed of the drive roller(s) 140.

An example system for transporting cargo units (e.g., ULDs) inside a Cargo Compartment is shown in FIG. 17, the system comprising a plurality of PDUs (e.g., including first PDU 100A, second PDU 100B, and third PDU 100C) are used. In the area of the ball mat(s) 60, first PDU 100A is used for moving cargo units in a direction transverse to the fore/aft direction of the aircraft, this transverse direction being marked "IN/OUT", and the second PDU 100B is used for moving cargo units in the fore/aft direction, which is marked "FWD/AFT". In the area of the ball mat(s) 60, for the transport of cargo units in the transverse direction, the drive roller of first PDU 100A has to be in the deployed position shown in FIG. 16B and the drive roller of the second PDU 100B has to be in the retracted position shown in FIG. 16A. In the area of the ball mat(s) 60, for the transport of cargo units in the fore/aft direction, the drive roller of first PDU 100A has to be in the retracted position and the drive roller of the second PDU 100B has to be in the deployed position. In the embodiment shown, if no command is given, transverse direction first PDU 100A will be commanded into the deployed position to provide the Anti-Roll-Out functionality that can be used in the place of cargo sill latches. In case of power loss or power shut off, the drive roller of each of the PDUs 100A, 100B, 100C will remain in their current respective positions, either in the deployed or retracted positions. To bring the drive roller from the retracted position to the deployed position and, conversely, from the deployed position to the retracted position, the PDUs 100A, 100B, 100C are equipped with an actuator 160, such as an excenter. In some embodiments, the PDUs 100A, 100B, 100C have a mechanical override function to bring the drive roller to the retracted position to be able to unload cargo units from the cargo hold in case of a loss of power. This feature is advantageous because, at present, all "Single Aisle" PDUs (e.g., in cargo holds having only a main drive rail) are raised based on a joystick drive command in the transverse or longitudinal directions. Accordingly, when a loss of power occurs, these PDUs 100A, 100B, 100C are lowered automatically into the retracted position and do not remain in the deployed position.

Figure 18:
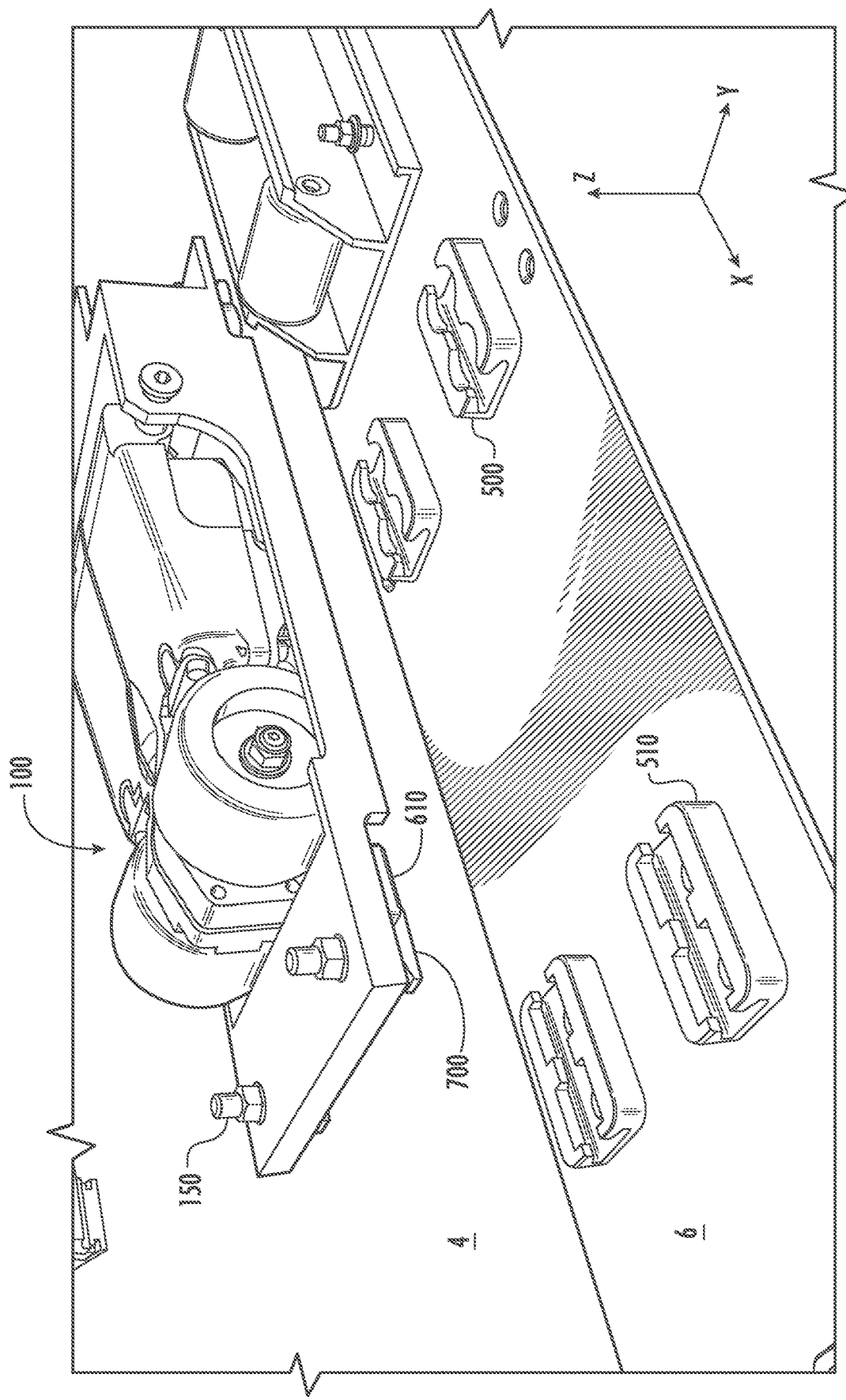
FIG. 18 is an exploded view of the PDU spaced apart from the main drive rail to show the attachment cleats used to removably secure the components of the cargo management system along the main drive rail to ensure a desired orientation of such components is maintained.

Referring to FIG. 14, different cleats 500, 510, 520, 530 (e.g., those having differently shaped insets) can be used to ensure a proper orientation of a component, such as a PDU 100, such that the PDU 100 is not installed backwards, which may result in a reverse movement of the cargo unit within the cargo hold from that intended in such misconfigurations. As shown in FIGS. 15 and 18, a pair of circle cleats 500 is installed at a first position, spaced apart in the Y-direction, of the main drive rail 6 and a pair of square cleats 510 is installed at a second position, also spaced apart in the Y-direction, of the main drive rail 6. The specific shapes of the insets of the cleats used is generally immaterial and may be any combination, so long as they are "keyed" to only allow installation of the specified component of the cargo management system in only one orientation. Other components having no preferred directionality, such as the roller assemblies 200, may be mounted using cleats, such as square cleats 510 in FIG. 14 that are the same or different from each other at the respective opposing ends of the roller assembly, because there is no directionality needed to ensure proper functioning of such components.

Figure 19:
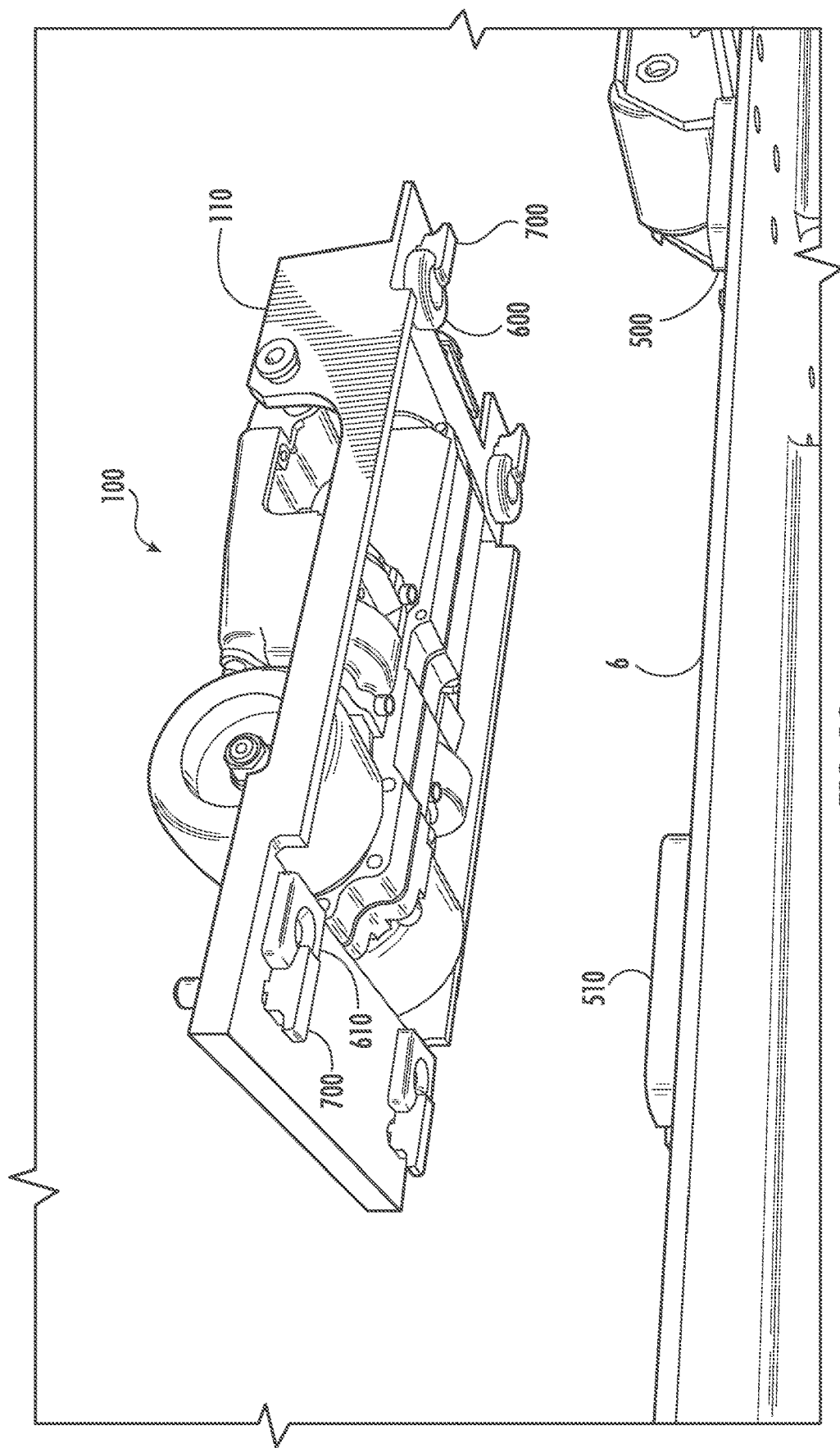
FIG. 19 is another exploded view of the PDU shown in FIG. 13 spaced apart from the main drive rail to show the keyed engagement features that are attached to the underside of the frame of the components of the cargo management system, the keyed engagement features being provided to fit only within compatible attachment cleats.

Fasteners 700 (e.g., threadable rotary tightening members, such as screws, nuts, and the like) are provided on each component (e.g., PDUs 100, roller assemblies 200, X-Z latches 300, and the like) in a position accessible from the top surface of the components being installed, extending through a thickness thereof to a position in which rotatable fasteners 700 become rigidly (e.g., removably) engaged with the flanges 506 of the cleats 500, 510, 520, 530, thereby allowing the component to be tightened securely in the designated position to allow safe and reliable operation of the cargo management system. FIG. 19 shows a bottom view of an example PDU 100 having square keys 610 at the corners of a first end thereof and circle keys 600 at the corners of a second end thereof. The rotatable fasteners 700 can take any shape, but in the embodiment shown have that of an inverted "T" shape, extending vertically through the slot 508 and beneath the flanges 506 of the respective cleat 500, 510, 520, 530 to allow rotary movement of the rotatable fastener 700 without striking the cleat 500, 510, 520, 530 itself and also allowing engagement of the rotatable fastener 700 beneath the flanges 506 of the cleat 500, 510, 520, 530 for retention of the component thereto. In some embodiments, the rotary fastener 700 may have a length (e.g., a distance between ends of the "T" shape) that is greater than a width between the side walls 504 of the cleat, such that the rotatable fastener 700 cannot turn more than ±90° within the cleat 500, 510, 520, 530 without contacting one or both of the side walls 504, thereby allowing the rotary fastener 700 to be progressively turned to tighten (e.g., squeeze, as by a spring) the flanges 506 of the cleat 500, 510, 520, 530 between the rotatable fastener 700 and the bottom side of the frame of the component being attached thereto, thus securing the component to the cleat 500, 510, 520, 530 in a designated configuration. As such, it is advantageous for the keyed feature (e.g., 600, 610, 620), regardless of the shape, to have a thickness that is less than or, preferably, a same thickness as, that of the flanges 506 of the cleat 500, 510, 520, 530 against which it is engaged so that a rotary movement of the rotatable fastener 700 is not impeded by the keyed feature itself.

Figure 20A:
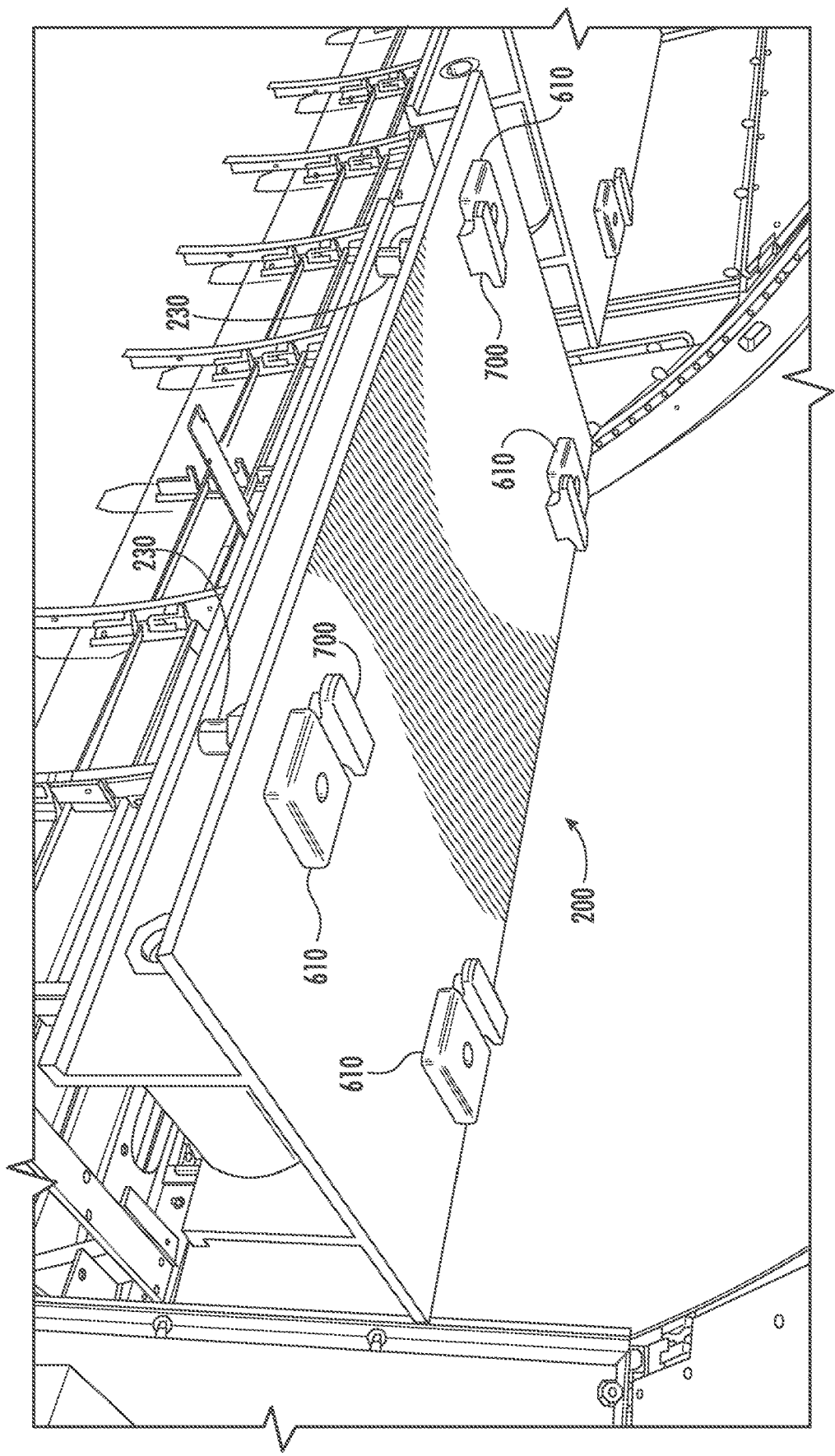
FIG. 20A shows keyed engagement features in the shape of a square and rotatable fasteners on the underside of the frame of a roller assembly, the keyed engagement features and rotatable fasteners being arranged to fit within and engage with the square-shaped recessed insets in the square cleat shown in FIG. 20B.
Figure 20B:
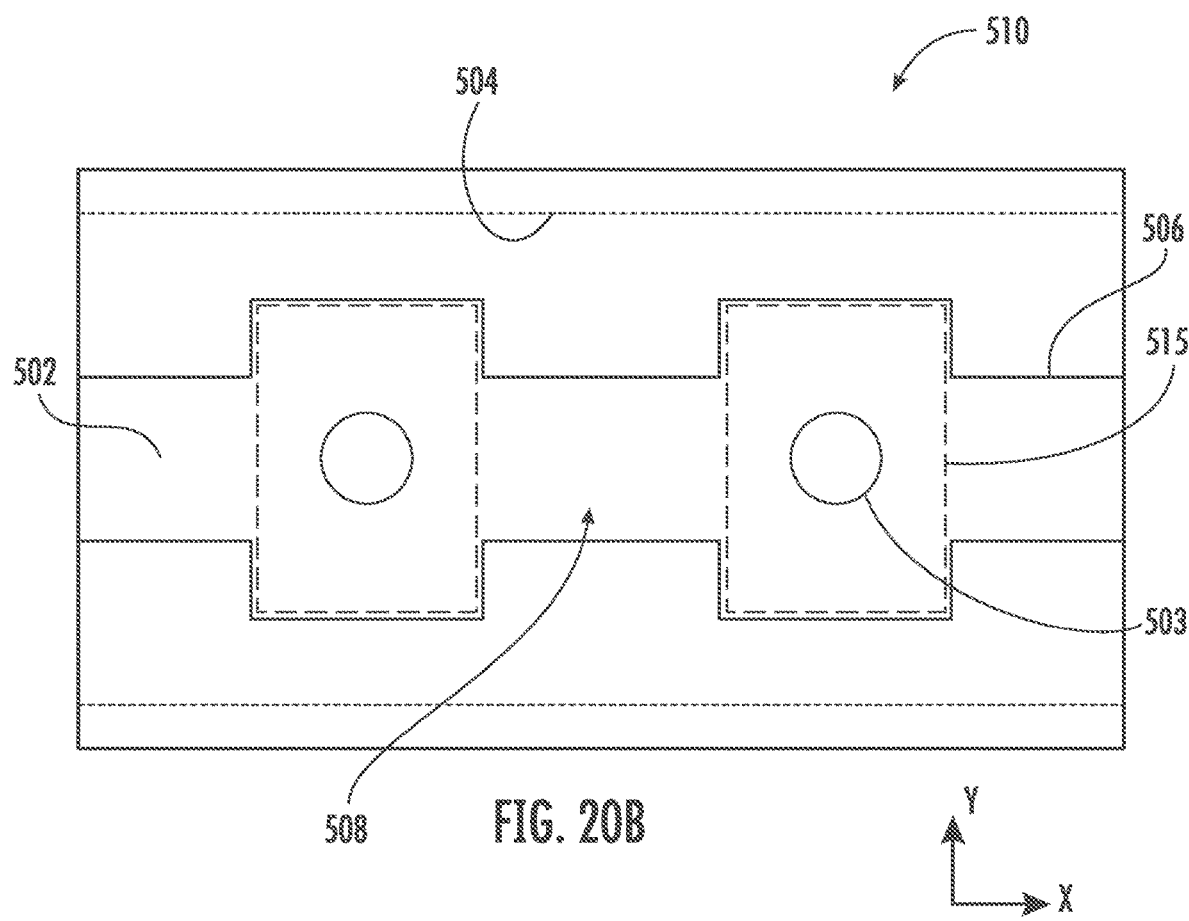

FIG. 20A shows square keys 610 and rotatable fasteners 700 on the underside of a roller assembly 200. The square keys 610 and rotatable fasteners 700 are configured to engage with the flanges 506 and square insets 515 (see also, FIG. 24B) of a square cleat 510, an example embodiment of which is shown in FIG. 20B. The square cleat 500 has a base 502 with mounting hole(s) 503 formed through a thickness of the base 502 to secure the square cleat 510 to the cargo hold floor 4 using fasteners passing through the mounting hole(s) 503. The square cleat 510 has side walls 504 extending away from the base 502 out of the X-Y plane and connecting with flanges 506, the height of the side walls 504 defining a thickness of the slot 508 oriented along the length of the square cleat 510 in the X-direction. The flanges 506 and the slot 508 are shaped to form square insets 515 that are configured to ensure proper alignment of, and engagement with, a component having square keys (e.g., 610, FIG. 20A) on a bottom surface thereof. The slot 508 is continuous and uninterrupted along the length of the square cleat 510. The square cleat 510 has two mounting holes 503 formed in the base 502 for fasteners (e.g., bolts, screws, rivets, and the like) to pass through to rigidly secure the square cleat 510 to the cargo hold floor 4. Any number of mounting holes 503 and fasteners may be used, in conjunction with pins formed on the back of the square cleat 510 to ensure proper alignment with a corresponding hole formed in the cargo hold floor 4, to attach and align the cleat 500 along the cargo hold floor 4 in a designated configuration. FIG. 20A shows the rotatable fasteners 700 in an engaged position, in which the square keys 610 of the roller assembly 200 could not be inserted into the square cleat 510, as the rotatable fastener 700 would contact the top surface of the flange 506 of the square cleat 510, thereby preventing passage of the rotatable fasteners 700 beyond the flanges 506 and through the slot 508 unless the rotatable fastener 700 were to be rotated from the orientation shown to align with the slot 508 of the square cleat 510.

Figure 21:
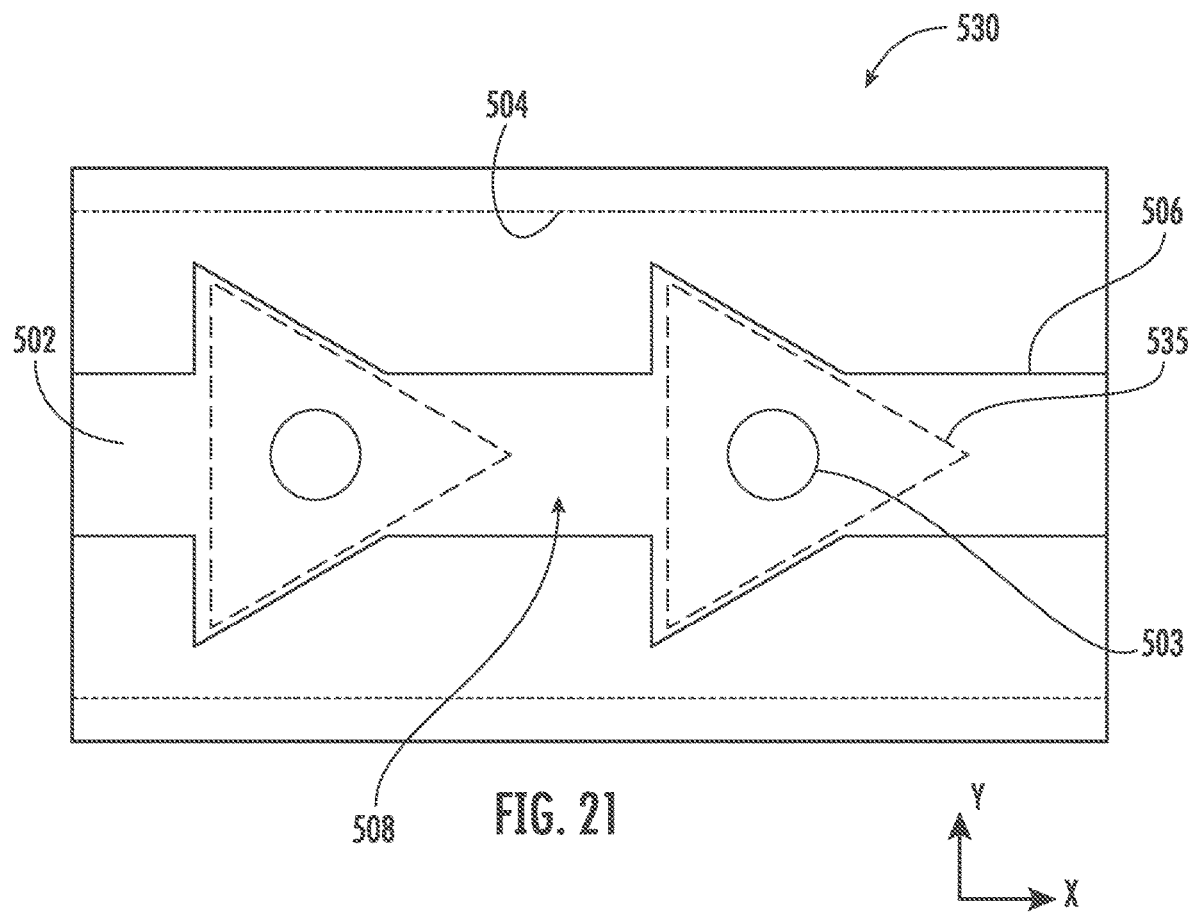
FIG. 21 shows an attachment cleat with triangle-shaped insets, into which corresponding keyed engagement features attached to a component of a cargo management system can be inserted to secure such a component within a cargo hold of an aircraft.

FIG. 21 shows an example embodiment of a triangle cleat 530. The triangle cleat 530 has a base 502 with mounting hole(s) 503 formed through a thickness of the base 502 to secure the triangle cleat 530 to the cargo hold floor 4 using fasteners passing through the mounting hole(s) 503. In some embodiments, alignment features may be formed in a back side of the base 502 to aid in installation of the triangle cleat 530 to the cargo hold floor 4. The triangle cleat 530 has side walls 504 extending away from the base 502 out of the X-Y plane and connecting with flanges 506, the height of the side walls 504 defining a thickness of the slot 508 oriented along the length of the triangle cleat 530 in the X-direction. The flanges 506 and the slot 508 are shaped to form triangle insets 535 (see also, FIG. 24C) that are configured to ensure proper alignment of, and engagement with, a component having triangle keys on a bottom surface thereof. The rotary fasteners 700 of a component are configured to vertically pass through the slot 508 of the triangle cleat 530 and be twisted to secure the component to the triangle cleat 530.

Figure 22B:
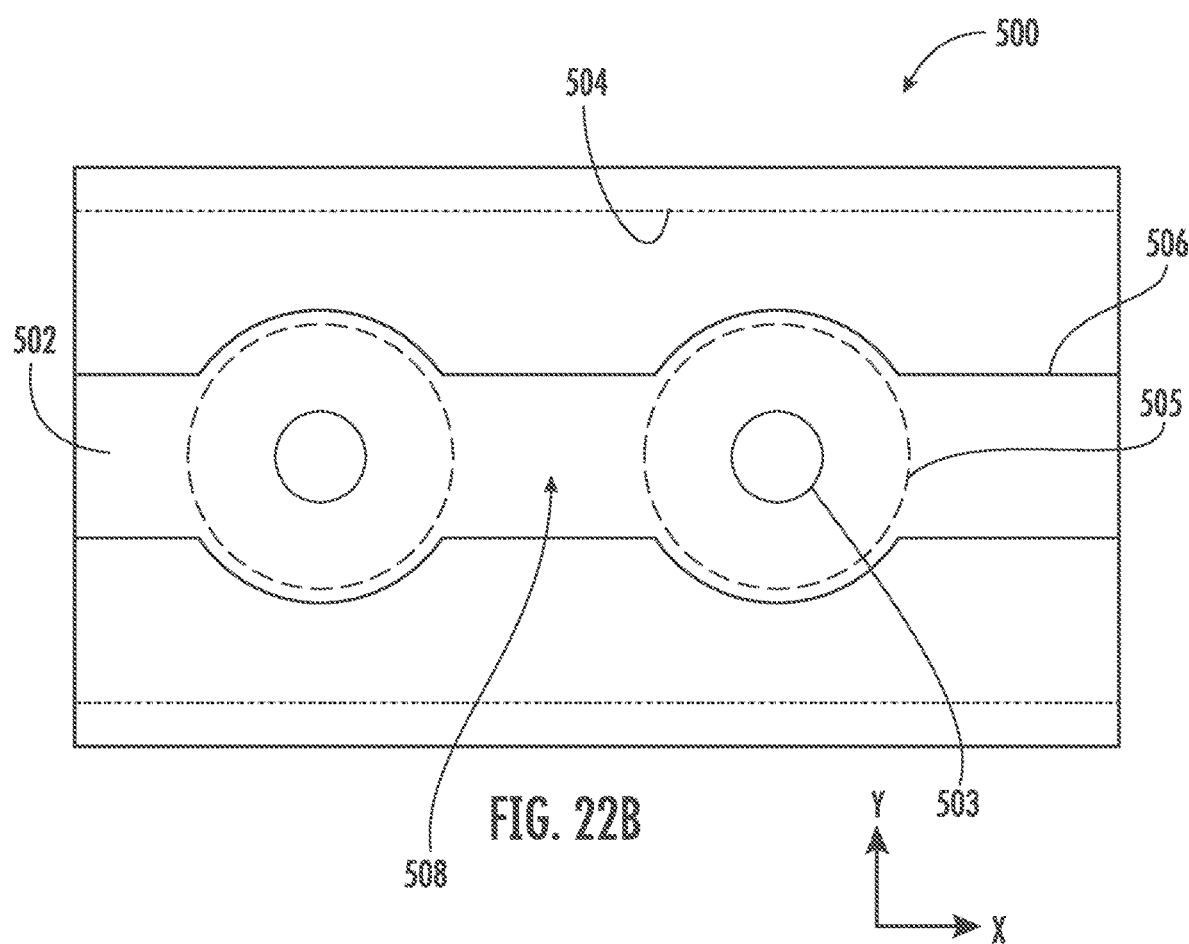
FIG. 22A shows keyed engagement features in the shape of a circle and rotatable fasteners on the underside of a frame of a PDU, the keyed engagement features and rotatable fasteners being arranged to fit within and engage with a circle-shaped recessed insets in the corresponding circle cleat shown in FIG. 22B.

FIG. 22A shows a bottom surface of a PDU 100 having circle keys 600 that are configured to engage with a circle cleat 500, an example embodiment of which is shown in FIG. 22B. The circle cleat 500 has a base 502 with mounting hole(s) 503 formed through a thickness of the base 502 to secure the circle cleat 500 to the cargo hold floor 4 using fasteners passing through the mounting hole(s) 503. In some embodiments, alignment features may be formed in a back side of the base 502 to aid in installation of the circle cleat 500 to the cargo hold floor 4. The circle cleat 500 has side walls 504 extending away from the base 502 out of the X-Y plane and connecting with flanges 506, the height of the side walls 504 defining a thickness of the slot 508 oriented along the length of the circle cleat 500 in the X-direction. The flanges 506 and the slot 508 are shaped to form circle insets 505 (see also, FIG. 24A) that are configured to ensure proper alignment of, and engagement with, a component having circle keys 600 on a bottom surface thereof. The rotary fasteners 700 of a component are configured to vertically pass through the slot 508 of the circle cleat 500 and be twisted to secure the component to the circle cleat 500.

Figure 23A:
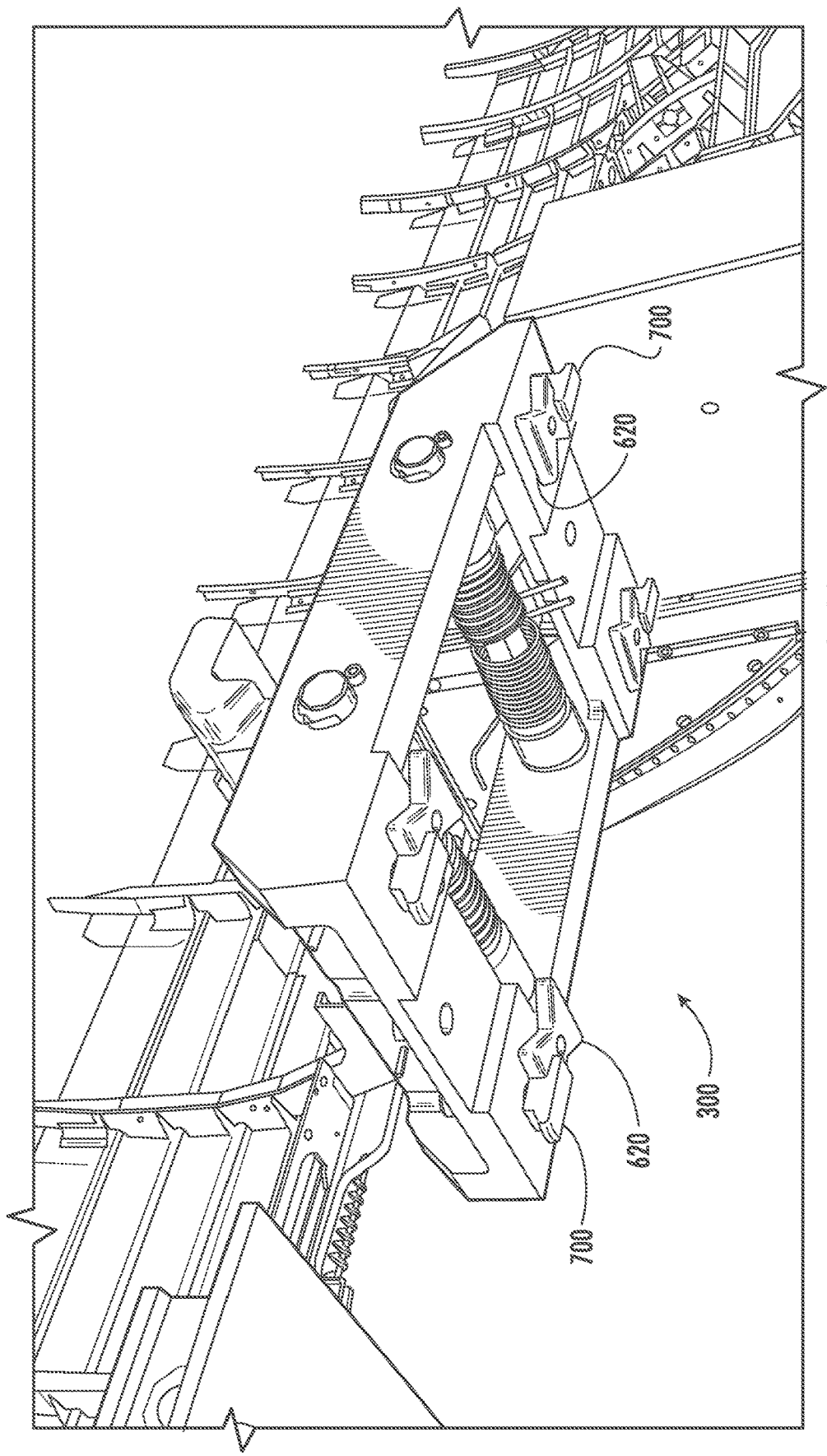
FIG. 23A shows keyed engagement features generally in the shape of an hourglass and rotatable fasteners on the underside of the frame of a roller assembly, the keyed engagement features and rotatable fasteners being arranged to fit within and engage with the hourglass-shaped recessed insets in the corresponding hourglass cleat shown in FIG. 23B.
Figure 23B:
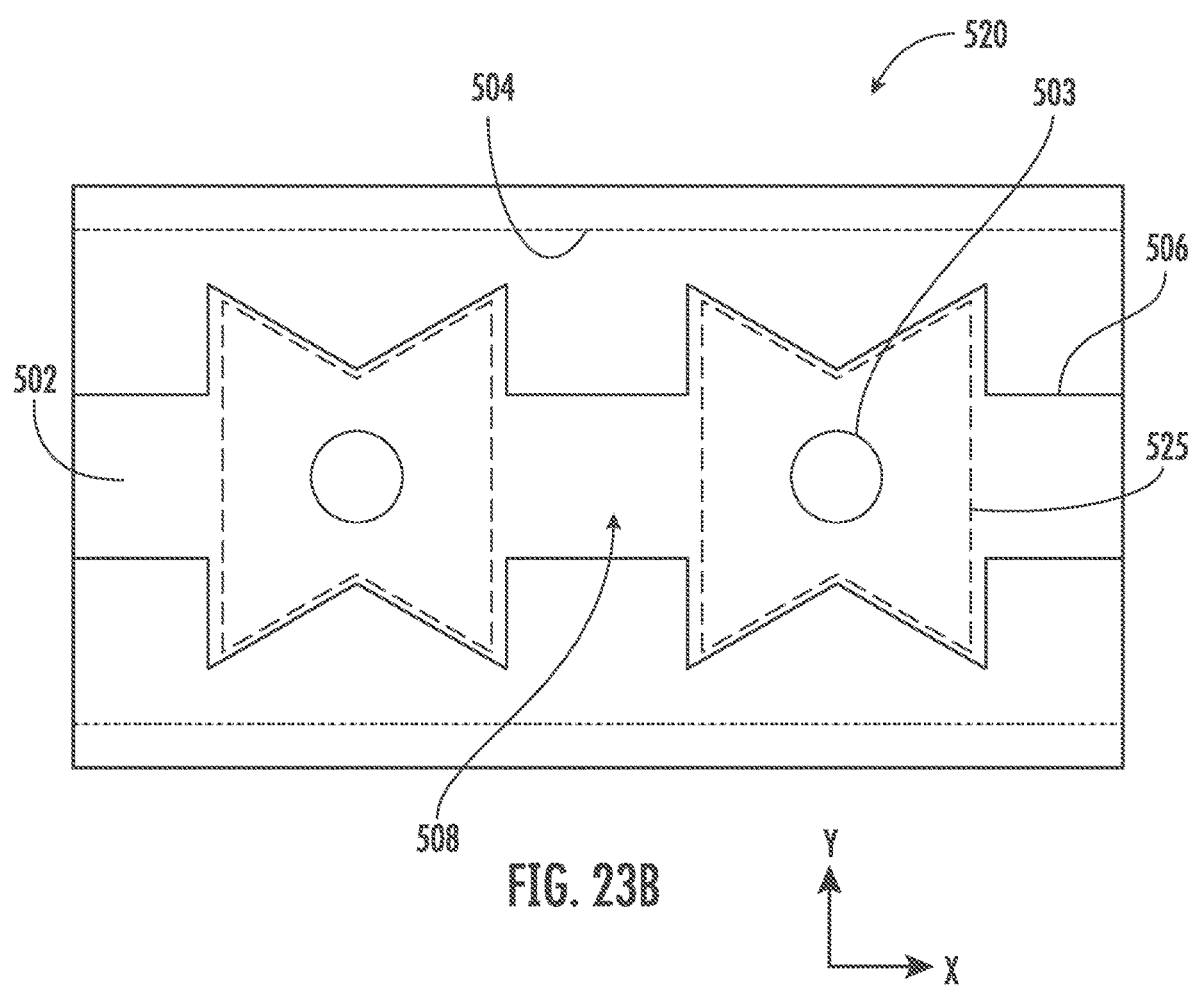
Figure 24A:
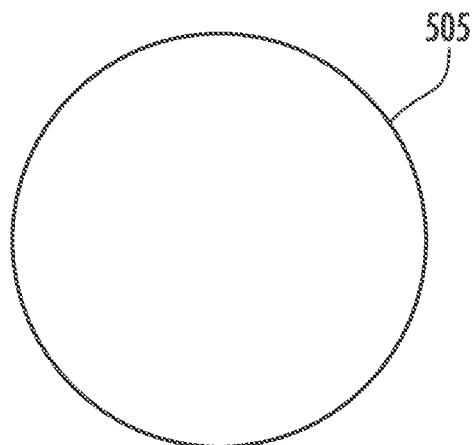
FIGS. 24A through 24D show example shapes suitable for use as the recessed insets of an attachment cleat and the keyed engagement features attached to a component of a cargo management system.
Figure 24B:
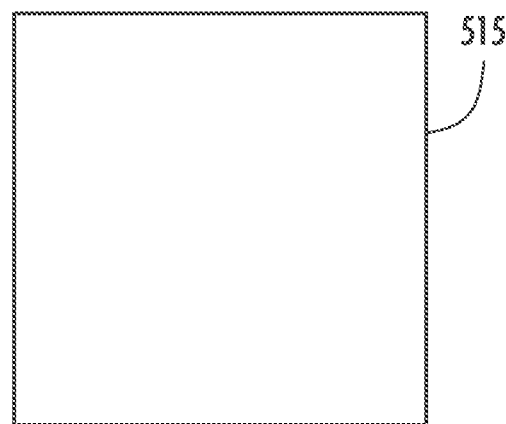
Figure 24C:
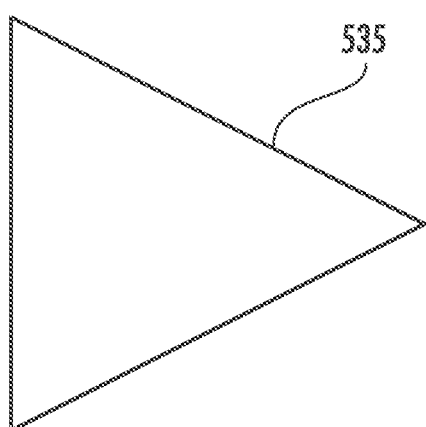
Figure 24D:
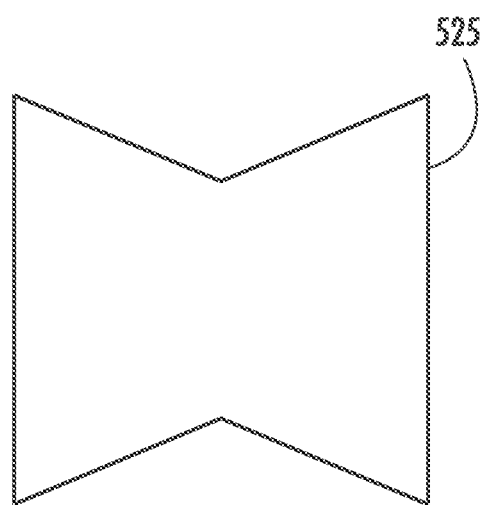

FIG. 23A shows a bottom surface of an X-Z latch 300 having hourglass keys 620 and rotatable fasteners 700 attached thereto and extending from an underside of a base of the X-Z latch 300. The hourglass keys 620 and the rotatably fasteners 700 are configured to engage with an hourglass cleat 520 to secure the X-Z latch 300 to the hourglass cleat 520. An example embodiment of an hourglass cleat 520 is shown in FIG. 23B. The hourglass cleat 520 has a base 502 with mounting hole(s) 503 formed through a thickness of the base 502 to secure the hourglass cleat 520 to the cargo hold floor 4 using fasteners passing through the mounting hole(s) 503. In some embodiments, alignment features may be formed in a back side of the base 502 to aid in installation of the hourglass cleat 520 to the cargo hold floor 4. The hourglass cleat 520 has side walls 504 extending away from the base 502 out of the X-Y plane and connecting with flanges 506, the height of the side walls 504 defining a thickness of the slot 508 oriented along the length of the hourglass cleat 520 in the X-direction. The flanges 506 and the slot 508 are shaped to form hourglass insets 525 (see also, FIG. 24D) that are configured to ensure proper alignment of, and engagement with, a component having hourglass keys 620 on a bottom surface thereof. The rotary fasteners 700 of a component are configured to vertically pass through the slot 508 of the hourglass cleat 520 and be twisted to secure the component to the hourglass cleat 520.

It is advantageous for the shapes and sizes of the respective keys and insets to be mutually exclusive, such that, for example, a circle key cannot fit within a square inset, a triangle inset, or an hourglass inset; a square key cannot fit within a circle inset, a triangle inset, or an hourglass inset; a triangle key cannot fit within a circle inset, a square inset, or an hourglass inset; and an hourglass key cannot fit within a circle inset, a square inset, or a triangle inset.

A method of installing components of a cargo management system is disclosed herein, the method comprising: forming and/or providing insets having a first shape in an upper surface of a first subset of a plurality of cleats; forming and/or providing insets having a second shape in an upper surface of a second subset of the plurality of cleats; rigidly attaching a plurality of cleats to a floor of the cargo hold; attaching keys and rotatable fasteners to the components of the cargo management system, a first subset of the keys having the first shape and a second subset of the keys having the second shape; engaging the first subset of keys with the first subset of cleats; engaging the second subset of keys with the second subset of cleats; and rotating the rotatable fasteners are configured to secure the components of the cargo management system to a respective cleat against which the rotary fastener is engaged. In some embodiments of the method, the first and second shapes are different shapes. In some embodiments of the method, the first and second shapes comprise geometric or amorphous shapes. In some embodiments of the method, the geometric shapes comprise one or more of a square, a triangle, a circle, a hexagon, a pentagon, and an hourglass. In some embodiments of the method, each cleat comprises a back, through which each cleat is rigidly attached to the cargo hold floor 4, at least two side walls on opposing lateral sides of the back, and a top surface, against which the rotatable fasteners are tightened to secure the components of the cargo management system to the cleat. In some embodiments of the method, at least one cleat has at least two insets formed through a thickness of the upper surface, into which a corresponding one of the keys can be inserted during installation of the components of the cargo management system. In some embodiments of the method, at least one cleat has a slot formed through a thickness of the upper surface, the slot being continuous and uninterrupted along a length of the cleat to bifurcate the upper surface of the cleat, thereby defining at least two flanges in the cleat. In some embodiments, the method comprises inserting the rotatable fasteners through the slot to engage with an internal surface of the at least two flanges. In some embodiments, the method comprises progressively tightening the flanges between the rotatable fastener and the component of the cargo management system to which the tightener is attached by rotating the tightener in a first direction. In some embodiments of the method, a width of the rotatable fasteners is less than a distance between the side walls of the cleat.

Figure 25:
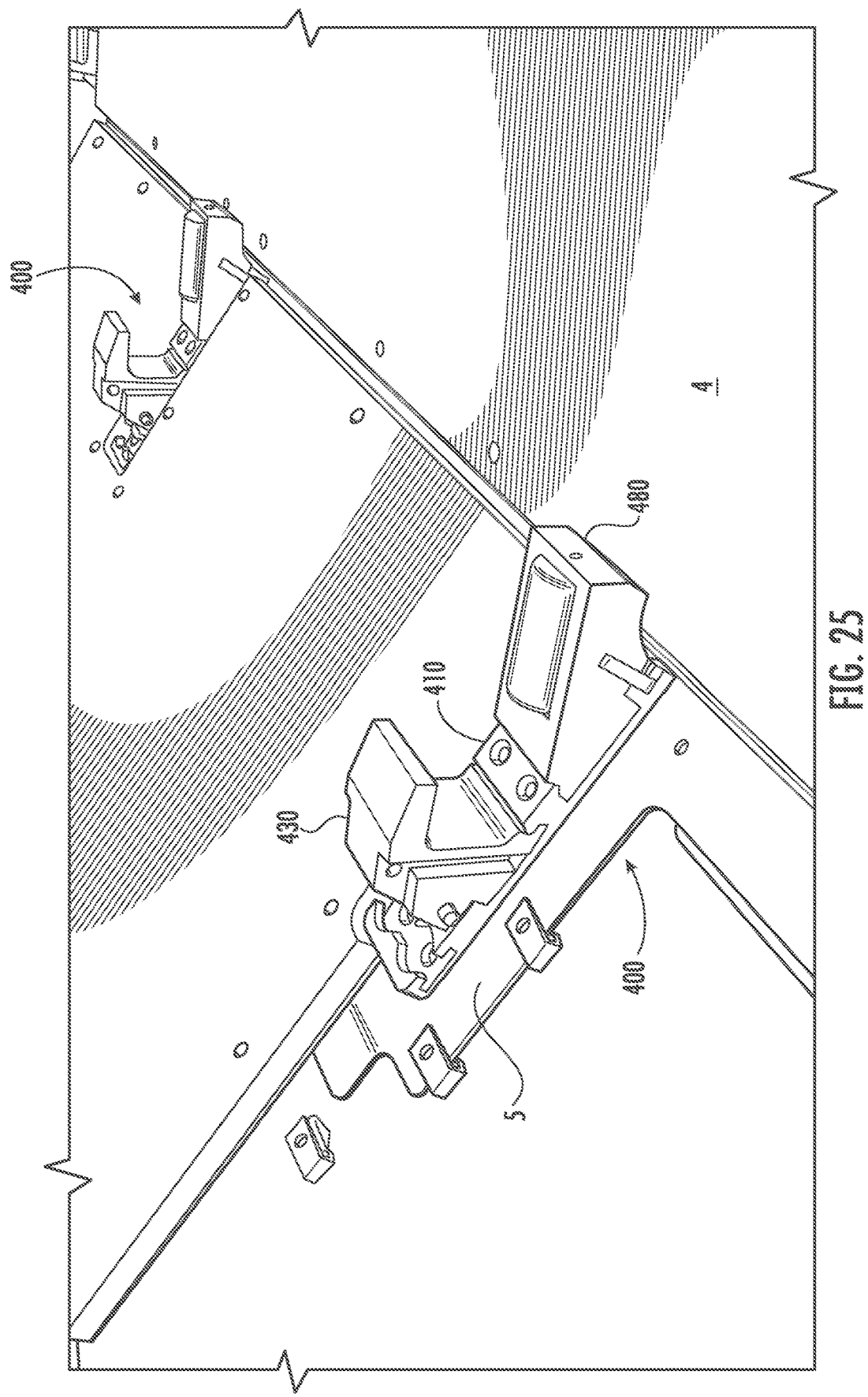
FIG. 25 is an isolated view of a Y-Z latch installed within the cargo hold of FIGS. 11 and 12, the Y-Z latch being for restraining movement of cargo engaged therewith in the Y- and Z-directions.

FIGS. 25 through 30 show various aspects of a Y-Z latch, generally designated 400, according to an example embodiment. As shown in FIG. 25, a base plate 410 is rigidly connected to the lateral sides 5 of the cargo hold. The base plate 410 has a latch head slot 424, which is configured to have a latch head 430 removably attached thereto, and/or a roller assembly slot 422, which is configured to have a roller assembly 480 removably attached thereto. The base plate 410 has an auxiliary slot 416 formed therein, which can be used to secure further features to the base plate 410.

Figure 26:
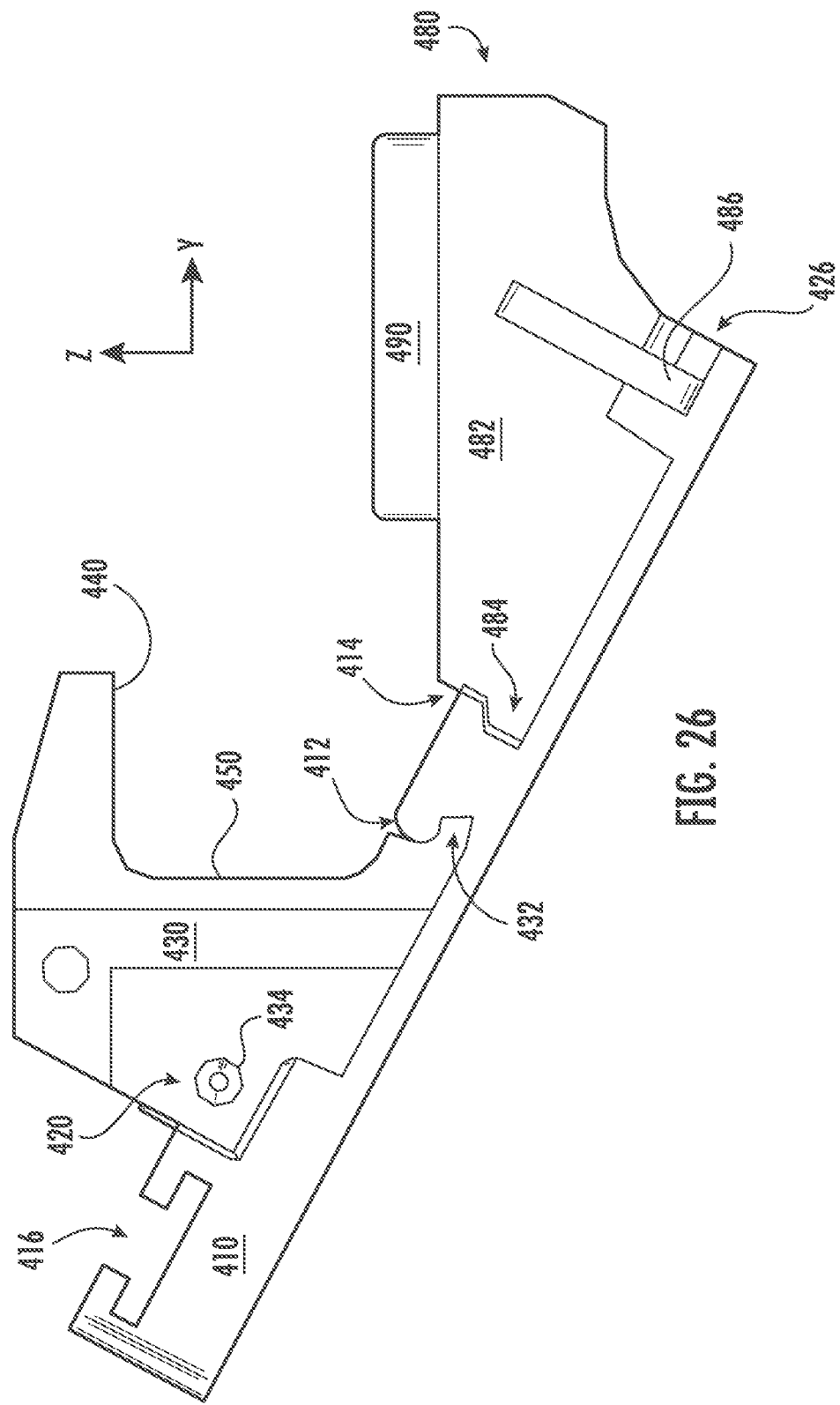
FIG. 26 is a side view of the Y-Z latch shown in FIG. 25.
Figure 27:
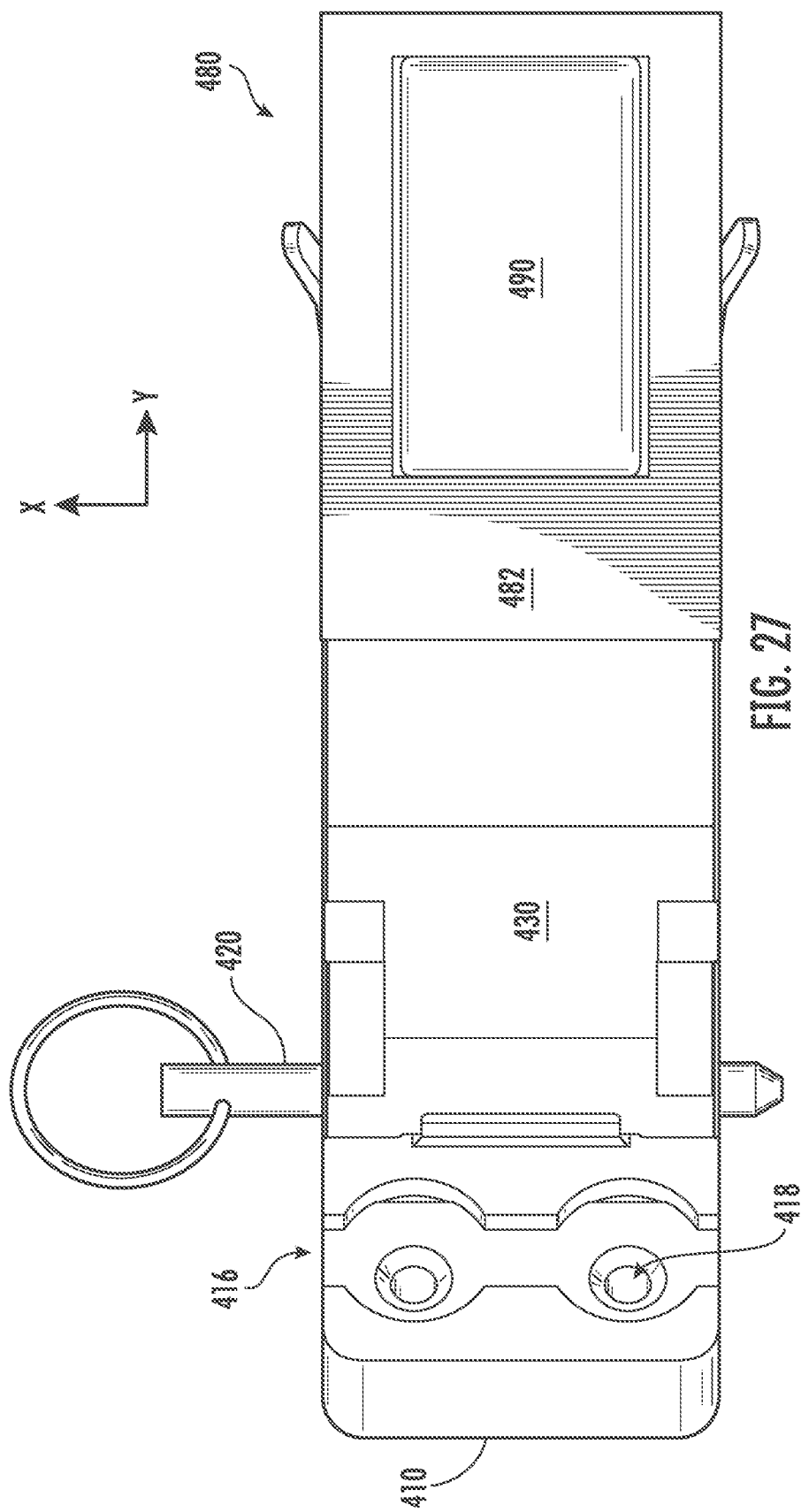
FIG. 27 is a top view of the Y-Z latch shown in FIG. 25.
Figure 28:
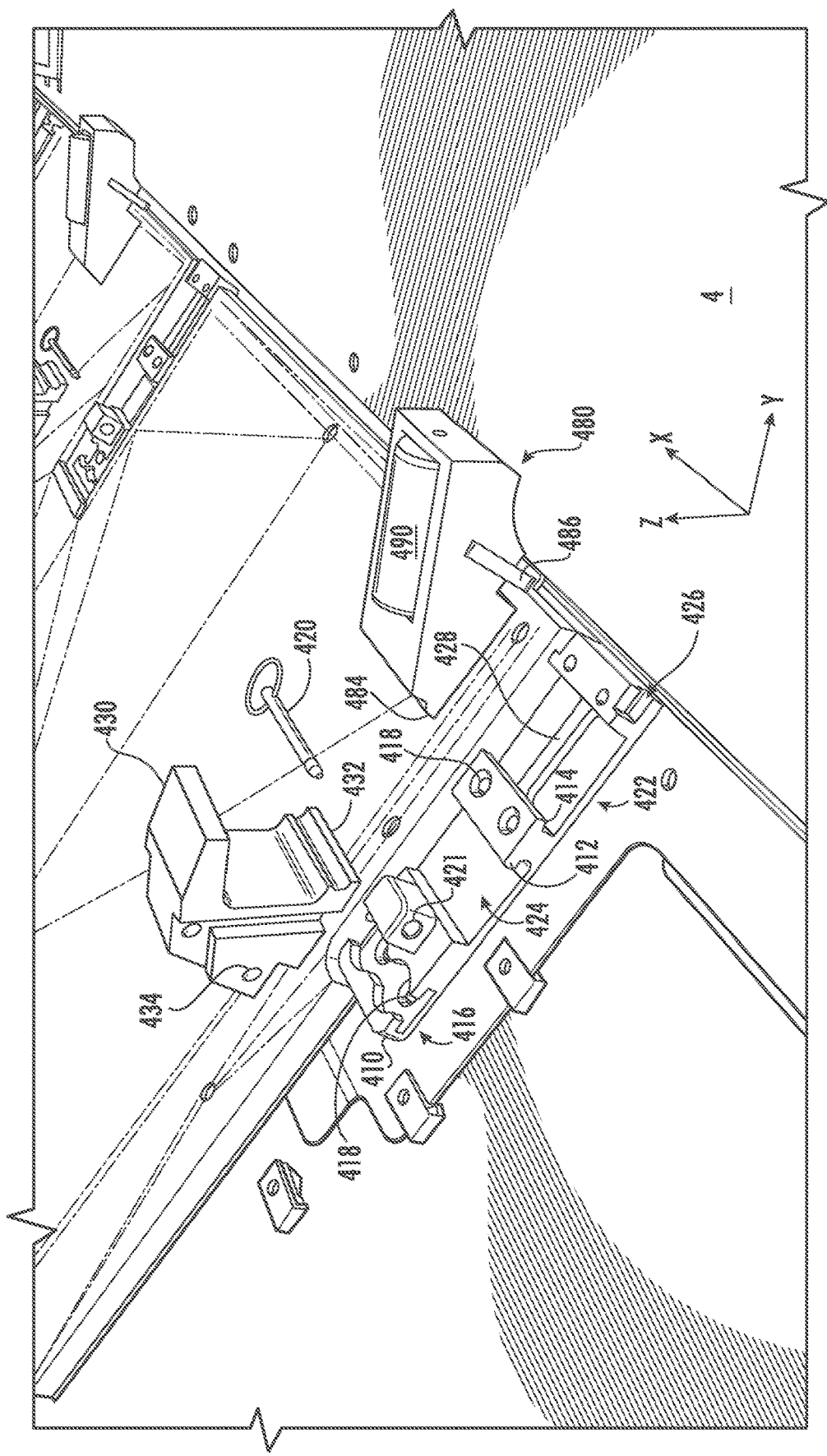
FIG. 28 is an exploded view of the Y-Z latch shown in FIG. 25.

The latch head 430 has a lateral (e.g., Y-direction) stop surface 450 and a vertical (e.g., Z-direction) stop surface 440. The latch head 430 is configured to prevent lateral and vertical movement of the cargo unit within the cargo hold while allowing movement of the cargo unit in the X-direction along the length of the aircraft. The latch head 430 has a latch toe 432 that engages, as shown in FIG. 26, against a base-latch heel 412 formed in the base plate 410. The latch head 430 is secured within the latch head slot 422 to the base plate 410 by a pull pin 420. To provide support against movement of the latch head 430 relative to the base plate 410 in the X-direction, the base plate 410 has a protuberance 423 formed thereon, over which the latch head 430 is secured, by a cavity corresponding in size and position to that of the protuberance 423, by the pull pin 420 The base plate 410 has a through-hole 421 extending through the protuberance 423 in the X-direction, and the latch head 430 has a passage 434 that, when the latch head 430 is fully installed over the base plate 410, the through-hole 421 and the passage 434 are substantially coaxially aligned, within a manufacturing tolerance, and can be rigidly secured together by inserting the pull pin 420 through a first portion of the passage 434, through the through-hole 421, and through a second portion of the passage 434, as shown in the example embodiment of FIGS. 25-30.

The roller assembly 480 comprises a roller 490 rotatably attached to a frame 482 of the roller assembly 480 to provide vertical support (e.g., in the Z-direction) to the cargo unit and substantially frictionless motion of the cargo unit in the X-direction along the length of the cargo hold. The roller assembly 480 has keyed alignment features that ensure that the roller assembly 480 cannot move relative to the base plate 410 in the X-direction. Among these alignment features are a roller toe 484 which is secured to the base plate 410 by a base-roller heel 414 formed in the base plate 410; a rib 428 formed along the length of the roller assembly slot 422 of the base plate 410 and a corresponding recess in the bottom surface of the roller assembly 480, which are both oriented so as to be substantially coplanar when installed together, extending in the Y-Z plane, substantially perpendicular to the X-direction; and lateral tabs 486 spaced apart on opposite sides of the roller assembly 480 in the X-direction, which fit into slots 426 formed on opposite sides of the base plate 410 in the X-direction. The lateral tabs 486 comprise protrusions that are configured to fit within a keyed portion of the slots 426 such that, when the roller assembly 480 is not fully engaged over the base plate 410, the lateral tabs 486 protrude from the roller assembly 480 in the X-direction and serve as a visual indicator that the roller assembly 480 is not fully engaged with the base plate 410. Furthermore, the engagement of the lateral tabs 486 into the keyed portion of the slots 426 of the base plate 410 provides a retention force to prevent the roller assembly 480 from separating from the base plate 410 in the Z-direction due to normal maneuvers of the aircraft in configurations of the cargo hold where the Y-Z latch is not engaged with a cargo unit. The base plate 410 has a plurality of mounting holes 418 formed through a thickness thereof for rigidly attaching the base plate 410 to the inner surface of the cargo hold.

Figure 29:
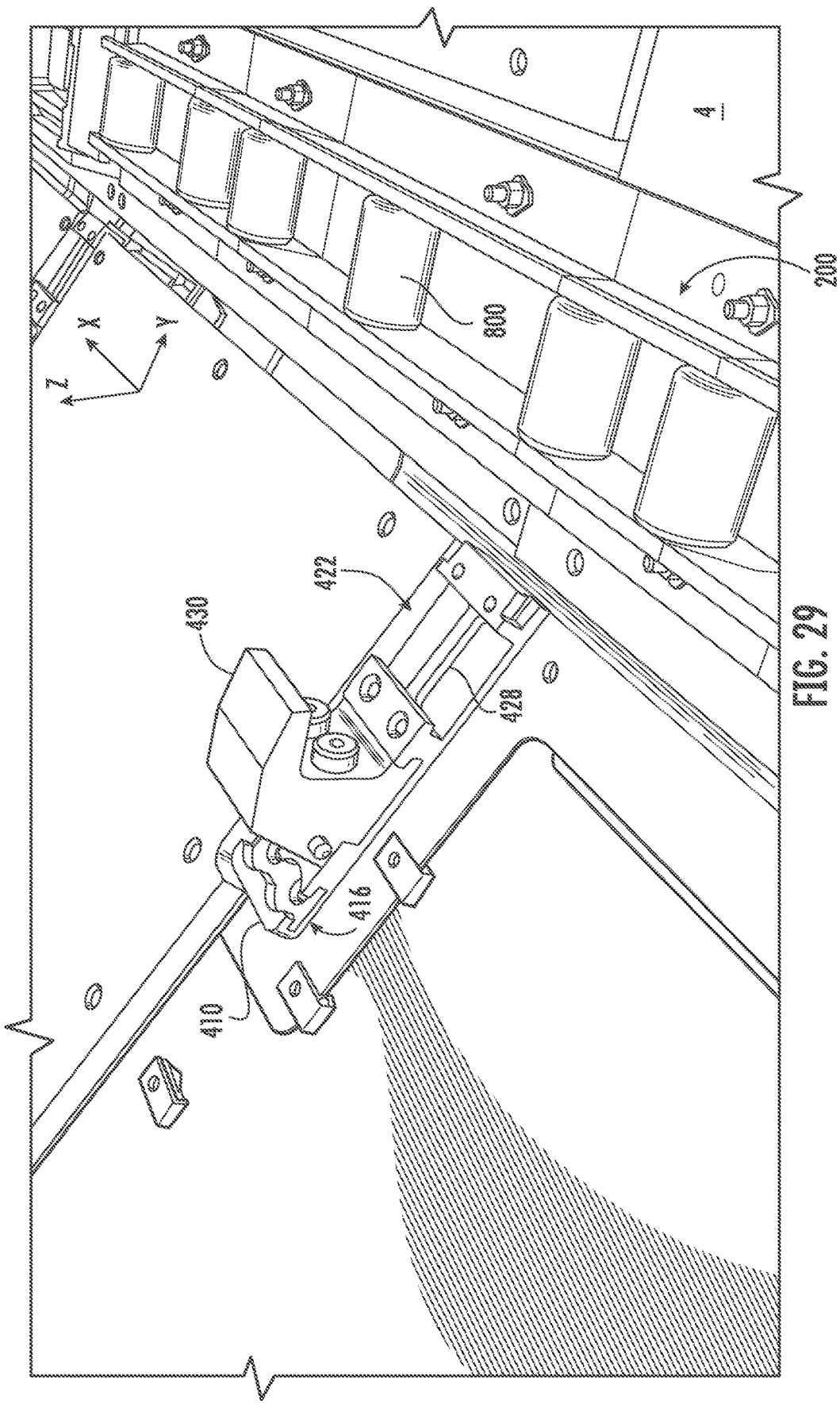
FIG. 29 is an isolated view of the Y-Z latch shown in FIG. 25 in an alternative configuration.

FIG. 29 shows an example embodiment of a second configuration of the Y-Z latch 400, in which the roller assembly (480, FIGS. 25-28) is omitted in embodiments of a cargo management system that incorporates fixed rollers 800 rigidly attached to the cargo hold floor 4. FIG. 30 shows an exploded view of the Y-Z latch according to the embodiment shown in FIG. 29.

Figure 31A:
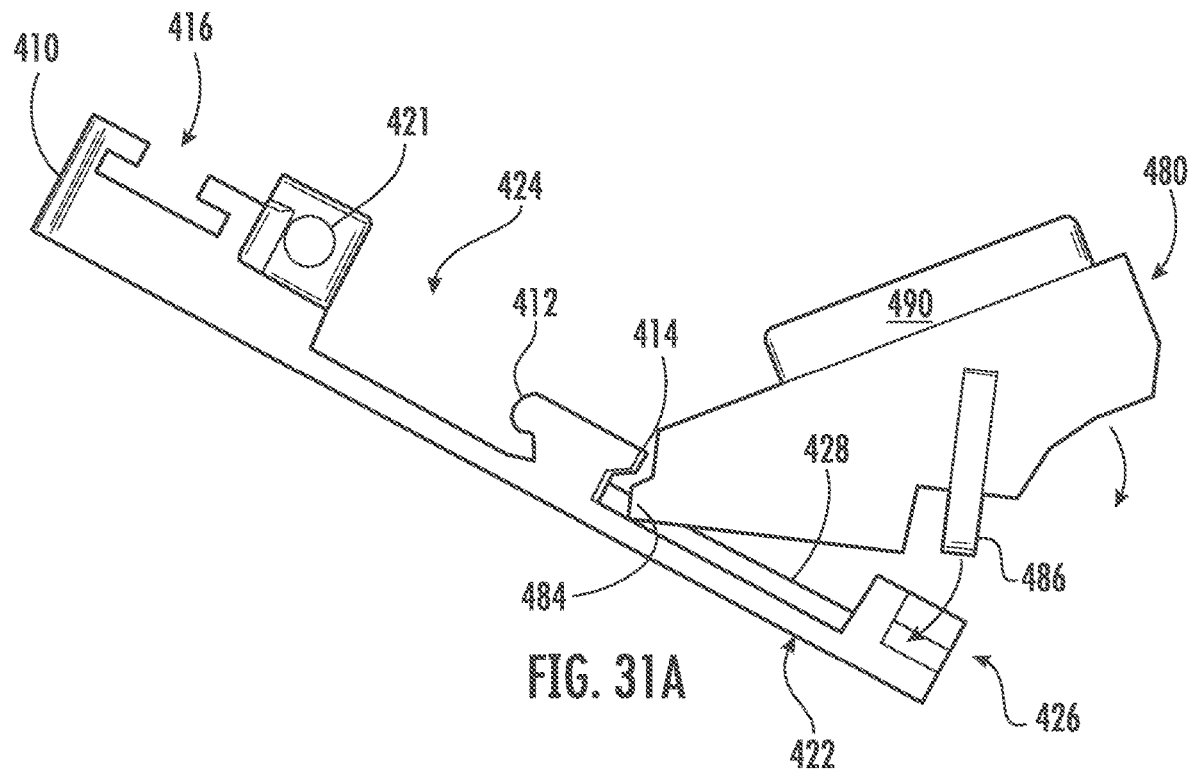
FIGS. 31A and 31B show installation motions of the constituent components of the Y-Z latch shown in FIG. 25.
Figure 31B:
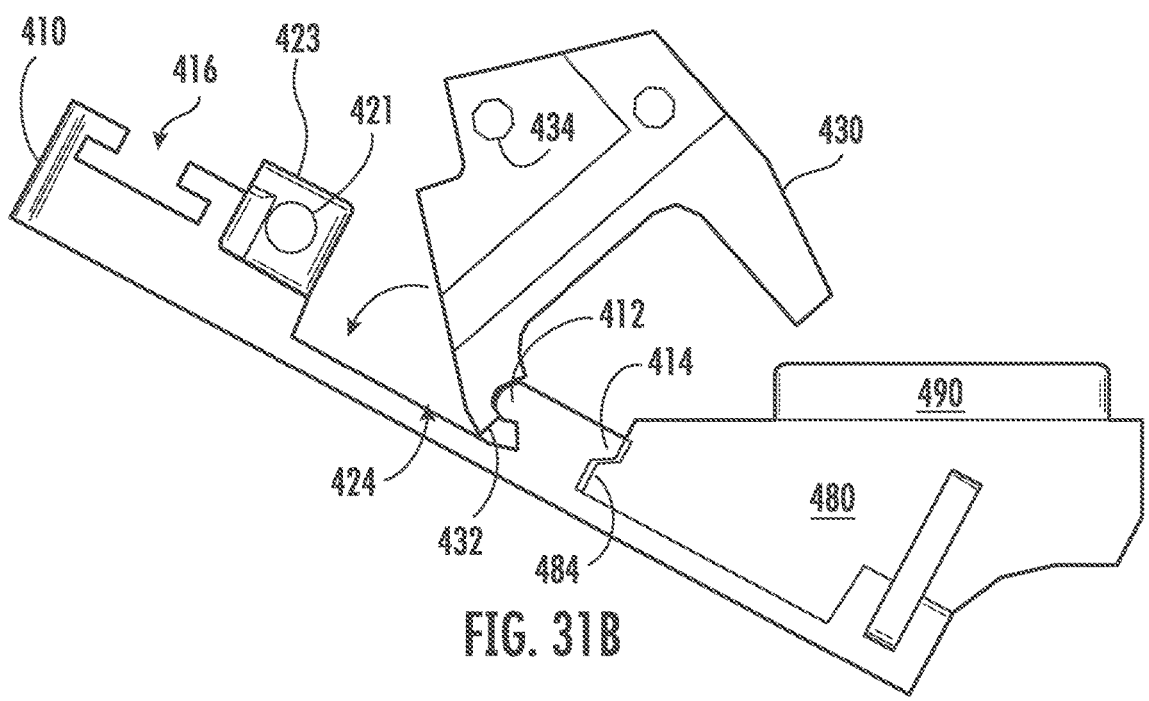

FIGS. 31A and 31B illustrate how the roller assembly 480 and the latch head 430 can be attached to the base plate 410. The roller toe 484 of the roller assembly 480 is inserted against the base-roller heel 414 and the roller assembly 480 is then pivoted in the clockwise direction into the roller assembly slot 422 of the base plate 410, as shown in FIG. 31A, such that the roller-base alignment features (426, 428, 486) engage with each other to retain the roller assembly 480 against the base plate 410. The latch toe 432 of the latch head 430 is inserted against the base-latch heel 412 and the latch head 430 is then pivoted in the counterclockwise direction into the latch head slot 424 of the base plate 410, as shown in FIG. 31B, such that the pull pin 420 can be inserted through the through-hole 421 of the base plate 410 and the passage 434 of the latch head 430 to secure the latch head 430 to the base plate 410.

As such, a method of assembling a Y-Z latch is disclosed. According to one embodiment, the method comprises attaching the base plate within the cargo hold of an aircraft, attaching the latch head to the base plate, and, optionally, attaching the roller assembly to the base plate. In some embodiments, attaching the latch head comprises engaging the latch toe against the base-latch heel of the base plate and pivoting the latch head down against the base plate, over the latch-base mounting feature (e.g., a protuberance extending from the base plate), and inserting the pull pin through a hole formed through the latch-base alignment feature and a through-hole formed through the latch head in the X-direction. In some embodiments, the latch-base alignment feature is configured to prevent a movement of the latch head relative to the base plate in the X-direction and the Y-direction. In some embodiments, the pull pin has a collar that is lockingly inserted around a narrowed portion to prevent removal of the pull pin without first removing the collar in a direction orthogonal to the direction of removal of the pull pin. In some embodiments, attaching the roller assembly to the base plate comprises engaging the roller toe against the base-roller heel of the base plate and pivoting the latch head down against the base plate, over the roller-base alignment features, such that the lateral tabs are located within a slot formed in the base plate. In some embodiments, the roller-base alignment features comprise a rib of the base plate and a corresponding recess in the bottom surface of the roller assembly, the rib and the recess being defined in the Y-Z plane, and the lateral tabs and keyed portion of the slots in the base plate. In some embodiments, the roller-base alignment features prevent motion of the roller assembly in at least the X-direction relative to the base plate. In some embodiments, the roller allows a motion of the cargo unit over/through the Y-Z latch in a substantially frictionless manner.

It is understood that the example embodiments disclosed herein are not limiting and do not restrict the object disclosed herein. In particular, it will be evident to the person skilled in the art that the features described herein may be combined with each other arbitrarily, and/or various features may be omitted therefrom, without any resultant devices, systems, and/or methods deviating from the subject matter disclosed herein.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise.

The invention claimed is:

1. A system for ensuring proper installation of components of a cargo management system within a cargo hold, the system comprising:
   a plurality of cleats rigidly attached to a floor of the cargo hold;
   a first subset of the plurality of cleats comprising insets having a first shape;
   a second subset of the plurality of cleats comprising insets having a second shape;
   keys and rotatable fasteners attached to the components of the cargo management system, a first subset of the keys having the first shape and a second subset of the keys having the second shape;
   wherein the first subset of keys can only engage with the first subset of cleats and the second subset of keys can only engage with the second subset of cleats, and
   wherein the rotatable fasteners are configured for rotary movement to secure the components of the cargo management system to a respective cleat, against which the rotary fastener is engaged.

2. The system of claim 1, wherein the first and second shapes are different shapes.

3. The system of claim 2, wherein the first and second shapes comprise geometric or amorphous shapes.

4. The system of claim 3, wherein the geometric shapes comprise one or more of a square, a triangle, a circle, a hexagon, a pentagon, and an hourglass.

5. The system of claim 1, wherein each of the cleats comprises a back, through which each cleat is rigidly attached to the cargo hold floor, at least two side walls on opposing lateral sides of the back, and a top surface, against which the rotatable fasteners are tightened to secure the components of the cargo management system to the cleat.

6. The system of claim 5, wherein at least one cleat has at least two insets formed through a thickness of the upper surface, into which a corresponding one of the keys can be inserted during installation of the components of the cargo management system.

7. The system of claim 5, wherein at least one cleat has a slot formed through a thickness of the upper surface, the slot being continuous and uninterrupted along a length of the cleat to bifurcate the upper surface of the cleat, thereby defining at least two flanges in the cleat.

8. The system of claim 7, wherein the rotatable fasteners are configured for insertion through the slot and to engage with an internal surface of the at least two flanges.

9. The system of claim 8, comprising a tightener for each rotatable fastener, wherein the tightener is configured to clamp the flanges between the rotatable fastener and the component of the cargo management system to which the tightener is attached progressively tighter due to a rotary movement of the tightener.

10. The system of claim 8, wherein a width of the rotatable fasteners is less than a distance between the side walls of the cleat.

11. A method of installing components of a cargo management system within a cargo hold, the method comprising:
    providing insets having a first shape in an upper surface of a first subset of a plurality of cleats;
    providing insets having a second shape in an upper surface of a second subset of the plurality of cleats;
    rigidly attaching a plurality of cleats to a floor of the cargo hold;
    attaching keys and rotatable fasteners to the components of the cargo management system, a first subset of the keys having the first shape and a second subset of the keys having the second shape;
    engaging the first subset of keys with the first subset of cleats;
    engaging the second subset of keys with the second subset of cleats; and
    rotating the rotatable fasteners configured to secure the components of the cargo management system to a respective cleat, against which the rotary fastener is engaged.

12. The method of claim 11, wherein the first and second shapes are different shapes.

13. The method of claim 12, wherein the first and second shapes comprise geometric or amorphous shapes.

14. The method of claim 13, wherein the geometric shapes comprise one or more of a square, a triangle, a circle, a hexagon, a pentagon, and an hourglass.

15. The method according to claim 11, wherein each cleat comprises a back, through which each cleat is rigidly attached to the cargo hold floor, at least two side walls on opposing lateral sides of the back, and a top surface, against which the rotatable fasteners are tightened to secure the components of the cargo management system to the cleat.

16. The method of claim 15, wherein at least one cleat has at least two insets formed through a thickness of the upper surface, into which a corresponding one of the keys can be inserted during installation of the components of the cargo management system.

17. The method of claim 15, wherein at least one cleat has a slot formed through a thickness of the upper surface, the slot being continuous and uninterrupted along a length of the cleat to bifurcate the upper surface of the cleat, thereby defining at least two flanges in the cleat.

18. The method of claim 17, comprising inserting the rotatable fasteners through the slot to engage with an internal surface of the at least two flanges.

19. The method of claim 18, comprising progressively tightening the flanges between the rotatable fastener and the component of the cargo management system to which the tightener is attached by rotating the tightener in a first direction.

20. The method of claim 18, wherein a width of the rotatable fasteners is less than a distance between the side walls of the cleat.

\* \* \* \* \*